US008417782B2

(12) United States Patent
Tendjoukian et al.

(10) Patent No.: US 8,417,782 B2
(45) Date of Patent: Apr. 9, 2013

(54) UNIVERSAL CALENDAR EVENT HANDLING

(75) Inventors: Meher Tendjoukian, Burlingame, CA (US); Marco Boerries, Los Altos Hills, CA (US); Venkatachary Srinivasan, Sunnyvale, CA (US); Matthias Breuer, Seevetal (DE); Torsten Schulz, Pinneberg (DE)

(73) Assignee: Yahoo! Inc., Sunnyvale, CA (US)

( * ) Notice: Subject to any disclaimer, the term of this patent is extended or adjusted under 35 U.S.C. 154(b) by 913 days.

(21) Appl. No.: 11/182,664

(22) Filed: Jul. 14, 2005

(65) Prior Publication Data
US 2007/0016646 A1  Jan. 18, 2007

(51) Int. Cl.
*G06F 15/16* (2006.01)
*G06F 3/00* (2006.01)

(52) U.S. Cl.
USPC ........... 709/206; 709/204; 709/248; 715/700; 715/963

(58) Field of Classification Search .................. 709/206, 709/204, 248; 719/318
See application file for complete search history.

(56) References Cited

U.S. PATENT DOCUMENTS

| | | | |
|---|---|---|---|
| 4,354,230 A | 10/1982 | Murphy et al. | |
| 5,371,743 A | 12/1994 | DeYesso et al. | |
| 5,371,882 A | 12/1994 | Ludlam | |
| 5,436,960 A | 7/1995 | Campana, Jr. et al. | |
| 5,457,478 A | 10/1995 | Frank | |
| 5,625,757 A | 4/1997 | Kageyama et al. | |
| 5,684,952 A | 11/1997 | Stein | |
| 5,727,202 A | 3/1998 | Kucala | |
| 5,742,905 A | 4/1998 | Pepe et al. | |
| 5,764,908 A | 6/1998 | Shoji et al. | |
| 5,814,798 A | 9/1998 | Zancho | |
| 5,862,330 A | 1/1999 | Anupam et al. | |
| 5,872,926 A | 2/1999 | Levac et al. | |

(Continued)

FOREIGN PATENT DOCUMENTS

| EP | 1 280 314 A2 | 1/2003 |
|---|---|---|
| EP | 1 376 990 A2 | 2/2004 |

(Continued)

OTHER PUBLICATIONS

Coulouris, G. at al. (1994). *Distributed Systems: Concepts and Design*. Second Edition, Addison-Wesley Publishing Company, pp. 222-233, 311-318.

(Continued)

*Primary Examiner* — Ranodhi Serrao
*Assistant Examiner* — Farrukh Hussain
(74) *Attorney, Agent, or Firm* — James J. DeCarlo; Greenberg Traurig, LLP

(57) ABSTRACT

System and method for handling calendar events among a plurality of user devices in a communication network are disclosed. The system includes a device manager for interfacing with the plurality of user devices, where the plurality of user devices use different calendar applications and have calendar events in different data formats, and the plurality of user devices include at least a meeting organizer device and one or more attendee devices. The system further includes a calendar gateway for processing the calendar events to form a corresponding connected calendar-data-set for each connected user, where the connected calendar-data-set is stored in a calendar backend server and is shared among one or more devices of each connected user, and an email gateway for communicating the calendar events between the calendar gateway and the plurality of user devices.

27 Claims, 12 Drawing Sheets

U.S. PATENT DOCUMENTS

| | | |
|---|---|---|
| 5,956,719 A | 9/1999 | Kudo et al. |
| 6,069,896 A | 5/2000 | Borgstahl et al. |
| 6,108,779 A | 8/2000 | Dean et al. |
| 6,141,690 A | 10/2000 | Weiman |
| 6,144,999 A | 11/2000 | Khalidi et al. |
| 6,157,944 A | 12/2000 | Pedersen |
| 6,233,577 B1 | 5/2001 | Ramasubramani et al. |
| 6,243,398 B1 | 6/2001 | Kahane et al. |
| 6,256,676 B1 | 7/2001 | Taylor et al. |
| 6,292,833 B1 | 9/2001 | Liao et al. |
| 6,295,291 B1 | 9/2001 | Larkins |
| 6,304,981 B1 | 10/2001 | Spears et al. |
| 6,311,215 B1 | 10/2001 | Bakshi et al. |
| 6,333,973 B1 | 12/2001 | Smith et al. |
| 6,457,062 B1 | 9/2002 | Pivowar et al. |
| 6,463,463 B1 | 10/2002 | Godfrey et al. |
| 6,489,954 B1 | 12/2002 | Powlette |
| 6,496,858 B1 | 12/2002 | Frailong et al. |
| 6,530,083 B1 | 3/2003 | Liebenow |
| 6,546,425 B1 | 4/2003 | Hanson et al. |
| 6,622,192 B2 | 9/2003 | Chou et al. |
| 6,633,907 B1 | 10/2003 | Spencer et al. |
| 6,633,910 B1 | 10/2003 | Rajan et al. |
| 6,647,260 B2 | 11/2003 | Dusse et al. |
| 6,671,824 B1 | 12/2003 | Hyland et al. |
| 6,691,243 B1 | 2/2004 | Belgardt et al. |
| 6,697,977 B2 | 2/2004 | Ozaki |
| 6,728,786 B2 | 4/2004 | Hawkins et al. |
| 6,742,043 B1 | 5/2004 | Moussa et al. |
| 6,748,570 B1 | 6/2004 | Bahrs et al. |
| 6,751,661 B1 | 6/2004 | Geddes |
| 6,766,469 B2 | 7/2004 | Larson et al. |
| 6,769,124 B1 | 7/2004 | Schoening et al. |
| 6,785,868 B1 | 8/2004 | Raff |
| 6,813,770 B1 | 11/2004 | Allavarpu et al. |
| 6,857,123 B1 | 2/2005 | Nuxoll et al. |
| 6,868,444 B1 | 3/2005 | Kim et al. |
| 6,892,311 B2 | 5/2005 | Coppock et al. |
| 6,931,454 B2 | 8/2005 | Deshpande et al. |
| 6,944,662 B2 | 9/2005 | Devine et al. |
| 6,965,929 B2 | 11/2005 | Kumar |
| 7,000,032 B2 | 2/2006 | Kloba et al. |
| 7,017,105 B2 | 3/2006 | Flanagin et al. |
| 7,020,662 B2 | 3/2006 | Boreham et al. |
| 7,039,596 B1 * | 5/2006 | Lu .................................. 705/7.13 |
| 7,051,087 B1 | 5/2006 | Bahl et al. |
| 7,051,088 B2 | 5/2006 | Sesek |
| 7,073,050 B2 | 7/2006 | Chen et al. |
| 7,085,822 B1 | 8/2006 | Donatelli et al. |
| 7,085,824 B2 | 8/2006 | Forth et al. |
| 7,089,259 B1 | 8/2006 | Kouznetsov et al. |
| 7,089,297 B1 | 8/2006 | Salas et al. |
| 7,093,006 B2 | 8/2006 | Sanjeev et al. |
| 7,149,810 B1 * | 12/2006 | Miller et al. ................... 709/246 |
| 7,212,814 B2 | 5/2007 | Wilson et al. |
| 7,340,484 B2 * | 3/2008 | S et al. ......................... 707/104.1 |
| 7,584,114 B2 * | 9/2009 | Estrada et al. ..................... 705/9 |
| 2001/0034791 A1 | 10/2001 | Clubb et al. |
| 2001/0056444 A1 | 12/2001 | Ide et al. |
| 2002/0107002 A1 | 8/2002 | Duncan et al. |
| 2002/0194083 A1 | 12/2002 | Balabhadrapatruni et al. |
| 2003/0018922 A1 | 1/2003 | Litwin, Jr. et al. |
| 2003/0084177 A1 | 5/2003 | Mulligan |
| 2003/0130882 A1 | 7/2003 | Shuttleworth et al. |
| 2003/0131059 A1 * | 7/2003 | Brown et al. .................. 709/206 |
| 2003/0145074 A1 | 7/2003 | Penick |
| 2003/0172138 A1 | 9/2003 | McCormack et al. |
| 2003/0172139 A1 | 9/2003 | Srinivasan et al. |
| 2003/0172175 A1 | 9/2003 | McCormack et al. |
| 2003/0212684 A1 | 11/2003 | Meyer et al. |
| 2004/0003132 A1 | 1/2004 | Stanley et al. |
| 2004/0010569 A1 | 1/2004 | Thomas et al. |
| 2004/0044774 A1 | 3/2004 | Mangalik et al. |
| 2004/0073615 A1 * | 4/2004 | Darling .......................... 709/206 |
| 2004/0083472 A1 | 4/2004 | Rao et al. |
| 2004/0111478 A1 | 6/2004 | Gross et al. |
| 2004/0128375 A1 | 7/2004 | Rockwell |
| 2004/0143836 A1 | 7/2004 | McCormack et al. |
| 2004/0199614 A1 | 10/2004 | Shenfield et al. |
| 2004/0210450 A1 | 10/2004 | Atencio et al. |
| 2004/0247090 A1 | 12/2004 | Nurmela |
| 2004/0249927 A1 | 12/2004 | Pezutti |
| 2005/0015599 A1 * | 1/2005 | Wang et al. .................... 713/176 |
| 2005/0059393 A1 | 3/2005 | Knowles |
| 2005/0164691 A1 | 7/2005 | Payne |
| 2005/0165947 A1 | 7/2005 | Auriemma et al. |
| 2005/0216441 A1 | 9/2005 | Thomas et al. |
| 2006/0047787 A1 | 3/2006 | Agarwal et al. |
| 2006/0156052 A1 | 7/2006 | Bodnar et al. |
| 2006/0212330 A1 * | 9/2006 | Savilampi ......................... 705/8 |
| 2006/0259511 A1 | 11/2006 | Boerries et al. |
| 2007/0014243 A1 | 1/2007 | Meyer et al. |
| 2007/0014244 A1 | 1/2007 | Srinivasan et al. |
| 2007/0014277 A1 | 1/2007 | Ebbesen et al. |
| 2007/0014278 A1 | 1/2007 | Ebbesen et al. |
| 2007/0014300 A1 | 1/2007 | Breuer et al. |
| 2007/0014303 A1 | 1/2007 | Schulz et al. |
| 2007/0014307 A1 | 1/2007 | Srinivasan et al. |
| 2007/0016632 A1 | 1/2007 | Schulz et al. |
| 2007/0016636 A1 | 1/2007 | Boerries et al. |
| 2007/0016676 A1 | 1/2007 | Breuer et al. |
| 2007/0028000 A1 | 2/2007 | Ebbesen et al. |
| 2007/0028293 A1 | 2/2007 | Boerries et al. |
| 2007/0038703 A1 | 2/2007 | Tendjoukian et al. |
| 2007/0100856 A1 | 5/2007 | Ebbesen |
| 2007/0100975 A1 | 5/2007 | Srinivasan et al. |
| 2007/0101021 A1 | 5/2007 | Meyer et al. |
| 2007/0101022 A1 | 5/2007 | Schulz et al. |
| 2007/0112880 A1 | 5/2007 | Yang et al. |

FOREIGN PATENT DOCUMENTS

| | | |
|---|---|---|
| EP | 1 376 990 A3 | 2/2004 |
| WO | WO-2004/025421 A2 | 3/2004 |
| WO | WO-2004/025421 A3 | 3/2004 |
| WO | WO-2004/040881 A1 | 5/2004 |
| WO | WO-2004/049104 A2 | 6/2004 |
| WO | WO-2005/0011215 A1 | 2/2005 |

OTHER PUBLICATIONS

International Search Report mailed Jul. 11, 2003, for PCT Application No. PCT/US03/07180 filed Mar. 11, 2003, 1 page.

International Search Report mailed Jun. 23, 2003, for PCT Application No. PCT/US03/07179 filed Mar. 11, 2003, 1 page.

International Search Report mailed Oct. 1, 2003, for PCT Application No. PCT/US03/07182 filed Mar. 11, 2003, 2 page.

International Search Report mailed Oct. 18, 2004, for PCT Application No. PCT/US04/02033 filed Jan. 21, 2004, 1 page.

International Search Report mailed Oct. 8, 2003, for PCT Application No. PCT/US03/07181 filed Mar. 11, 2003, 1 page.

U.S. Appl. No. 11/796,258, filed Apr. 27, 2007 for Yang et al.

International Search Report mailed on Nov. 28, 2006, for PCT Application PCT/US2006/026303, two pages.

Dawson, F. et al. (Nov. 1998). "Internet Calendaring and Scheduling Core Object Specification (iCalendar)," 139 pages.

Meeting Maker, Inc. (2005). "Meeting Maker Millennium Features & Benefits," located at http://www.meetingmaker.com/products/meetingmaker/features_benefits.cfm, last visited on Sep. 27, 2005, 2 pages.

Oracle Corporation. (1993). "Oracle Calendar Synchronization Tools," located at http://calagenda.berkeley.edu/help_training/usersguide/9.0.4-resourceguide/synctoo.htm, last visited on Sep. 26, 2005, 22 pages.

U.S. Appl. No. 11/182,203, filed Jul. 14, 2005 for Schulz et al., 93 pages.

U.S. Appl. No. 11/182,287, filed Jul. 14, 2005 for Schulz et al., 101 pages.

U.S. Appl. No. 11/182,348, filed Jul. 14, 2005 for Breuer et al., 93 pages.

U.S. Appl. No. 11/182,614, filed Jul. 14, 2005 for Boerries et al., 29 pages.

U.S. Appl. No. 11/182,663, filed Jul. 14, 2005 for Meyer et al., 94 pages.

U.S. Appl. No. 11/183,137, filed Jul. 14, 2005 for Srinivasan et al., 93 pages.

VocalTec Communication Ltd. (Jul. 2004). "Essentra™ Product Suite—General Description," 16 pages.

Becker, T. "Transparent Service Reconfiguration After Node Failures," *IEEE*, London, UK, Mar. 25-27, 1992, pp. 212-223.

Cecchet, E. et al. "C-JDBC: Flexible Database Clustering Middleware," *Proceedings of the USENIX Annual Technical Conference* 2004, ten pages.

Lee, B-Y. et al. (2002). "Data Synchronization Protocol in Mobile Computing Environment Using SyncML," *IEEE*, pp. 133-137.

Liang, D. et al. (2004). "NT-SwiFT: Software Implemented Fault Tolerance on Windows NT," *The Journal of Systems and Software* 71:127-141.

Miller, K. et al. (2004). "Synchronization of Mobile XML Databases by Utilizing Deferred Views," *IEEE*, pp. 186-191.

Final Office Action mailed Apr. 27, 2009, for U.S. Appl. No. 11/182,348, filed Jul. 14, 2005, 17 pages.

Final Office Action mailed Jul. 11, 2008, for U.S. Appl. No. 11/182,203, filed Jul. 14, 2005, 18 pages.

Non-Final Office Action mailed Apr. 1, 2009, for U.S. Appl. No. 11/183,137, filed Jul. 14, 2005, 11 pages.

Non-Final Office Action mailed Mar. 30, 2009, for U.S. Appl. No. 11/182,203, filed Jul. 14, 2005, 20 pages.

Non-Final Office Action mailed Mar. 4, 2009, for U.S. Appl. No. 11/182,663, filed Jul. 14, 2005, 24 pages.

Non-Final Office Action mailed Jul. 29, 2008, for U.S. Appl. No. 11/182,348, filed Jul. 14, 2005, 13 pages.

Non-Final Office Action mailed Oct. 23, 2007, for U.S. Appl. No. 11/182,203, filed Jul. 14, 2005, 15 pages.

Final Office Action mailed Sep. 28, 2009, for U.S. Appl. No. 11/182,663, filed Jul. 14, 2005, 26 pages.

Final Office Action mailed Oct. 16, 2009, for U.S. Appl. No. 11/182,203, filed Jul. 14, 2005, 22 pages.

Final Office Action mailed Oct. 27, 2009, for U.S. Appl. No. 11/183,137, filed Jul. 14, 2005, 11 pages.

Non-Final Office Action mailed Dec. 23, 2009, for U.S. Appl. No. 11/182,348, filed Jul. 14, 2005, 17 pages.

Office Action issued in connection with U.S. Appl. No. 11/182,348 mailed on Aug. 26, 2009.

Office Action issued in connection with U.S. Appl. No. 11/182,203 mailed on Dec. 4, 2009.

Office Action issued in connection with U.S. Appl. No. 11/182,203 mailed on Oct. 2, 2008.

* cited by examiner

UNIVERSAL CALENDAR EVENT HANDLING

CROSS-REFERENCE TO RELATED APPLICATIONS

This application is related to the following patent applications: U.S. application Ser. No. 11/182,348, filed Jul. 14, 2005, entitled "System and Method for Servicing a User Device," to Matthias Breuer et al.; U.S. application Ser. No. 11/182,614, filed Jul. 14, 2005, entitled "Methods and Systems for Data Transer and Notification Mechanisms," to Marco Boerris et al.; U.S. application Ser. No. 11/182,287, filed Jul. 14, 2005, entitled "Content Router", to Torsten Schulz et al., which are filed concurrently herewith and are hereby incorporated by reference in their entirety.

FIELD OF THE INVENTION

The present invention relates generally to the field of communicating electronic messages in a communication network. In particular, the present invention relates to system and method for managing calendar events between client devices and backends.

BACKGROUND OF THE INVENTION

The recent proliferation of electronic devices for communication, information management and recreation has taken routine computing power far away from the desk-bound personal computer (PC). Users are using devices such as cell phones, camera phones, personal digital assistants (PDAs) and navigation systems, not only in the office and in the home, but also in the field and on the road. There is a diverse range of possible applications for such devices, including communication, business, navigation, entertainment and even managing basic daily activities. Many users today only use a single device for a single task, for example, using cell phones for making and receiving phone calls. However, these devices are no longer single-function devices. They are capable of creating various types of data, for instance, electronic mail, voice messages, photos, video, etc. Increasing the number of functions of a device increases the level of personalization to the users.

However, many of such devices, such as the PC, PDA, and cell phone, do not run on the same operating system, and do not run the same calendar application. As a result, different calendar applications and different calendar data formats are created on different devices. A user is unable to share data effectively among the multiple devices he has. Thus, there is a need for a system and method that are able to automatically synchronize the connected calendar-data-set among the multiple devices a user may have. In addition, there is a need for a system and method that are able to communicate calendar events seamlessly across the multiple devices a user may have according to the capabilities of each device anywhere anytime.

Furthermore, a user may need to respond to a calendar event received from another user or send a calendar event to another user having different devices running different calendar application. Therefore, there is a need for a system and method that are able to communicate calendar events seamlessly among multiple users according to the capabilities of the different devices anywhere anytime.

SUMMARY

In one embodiment, a system for handling calendar events among a plurality of user devices in a communication network includes a device manager for interfacing with the plurality of user devices, where the plurality of user devices use different calendar applications and have calendar events in different data formats, and the plurality of user devices include at least a meeting organizer device and one or more attendee devices. The system further includes a calendar gateway for processing the calendar events to form a corresponding connected calendar-data-set for each connected user, where the connected calendar-data-set is stored in a calendar backend server and is shared among one or more devices of each connected user, and an email gateway for communicating the calendar events between the calendar gateway and the plurality of user devices.

In another embodiment, a method for handling calendar events among a plurality of user devices in a communication network includes interfacing with the plurality of user devices, where the plurality of user devices use different calendar applications and have calendar events in different data formats, and the plurality of user devices include at least a meeting organizer device and one or more attendee devices. The method further includes processing the calendar events to form a corresponding connected calendar-data-set for each connected user, where the connected calendar-data-set is stored in a calendar backend server and is shared among one or more devices of each connected user, and communicating the calendar events between the calendar gateway and the plurality of user devices.

BRIEF DESCRIPTION OF THE DRAWINGS

The aforementioned features and advantages of the invention as well as additional features and advantages thereof will be more clearly understandable after reading detailed descriptions of embodiments of the invention in conjunction with the following drawings.

Like numbers are used throughout the figures.

DESCRIPTION OF EMBODIMENTS

Methods and systems are provided for managing calendar events between a server and client devices. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description which follows are presented in terms of procedures, steps, logic blocks, processing, and other symbolic representations of operations on data bits that can be performed on computer memory. A procedure, computer-executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1A:
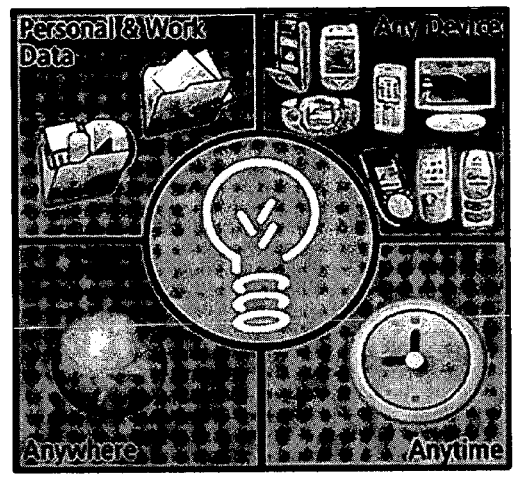
FIG. 1a illustrates a connected-life service according to an embodiment of the present invention.

FIG. 1a illustrates a connected-life service according to an embodiment of the present invention. The connected-life service enables users to share and access their connected-data-set with any device at anytime from anywhere. A connected user refers to a user who subscribes to the connected-life service. User devices (also referred to as device or client) may include cellular phones, wireless personal digital assistants, navigation devices, personal computers, game consoles, Internet terminals, and Kiosks. A connected-data-set may include emails, contacts, calendar, tasks, notes, pictures, documents, music, videos, bookmarks, and links.

Figure 1B:
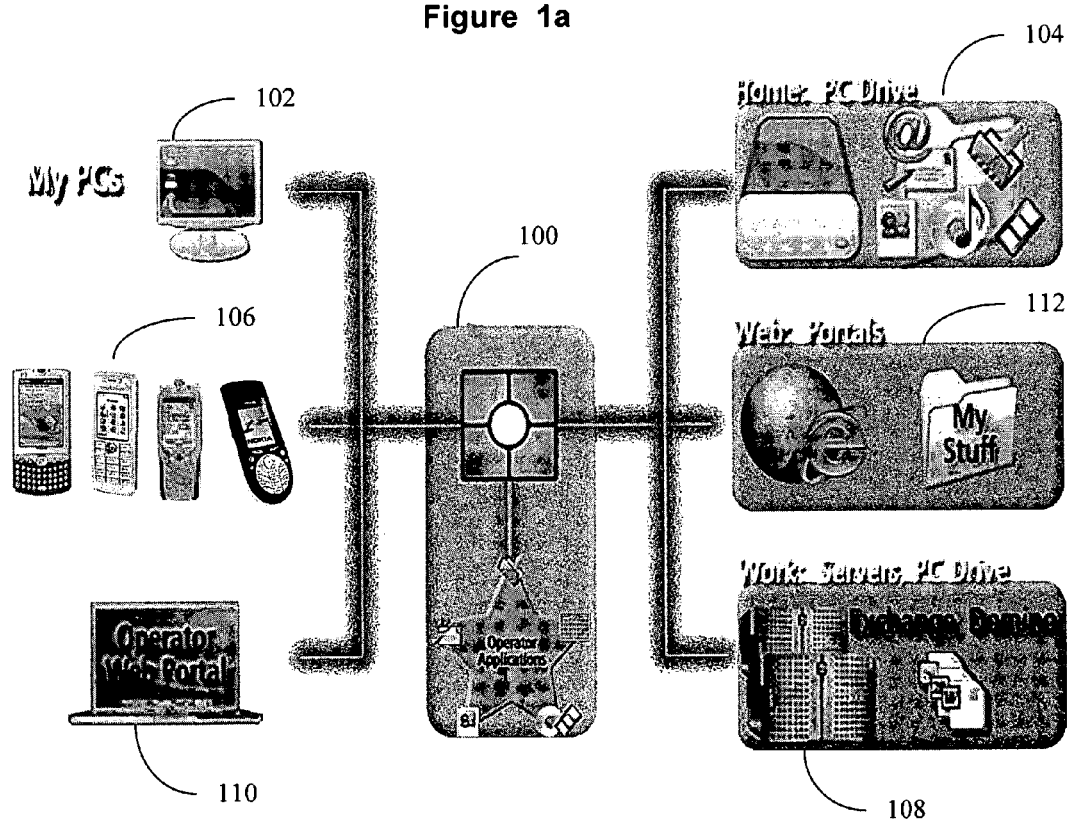
FIG. 1b illustrates a connected-life server in support of the connected-life service of FIG. 1a according to an embodiment of the present invention.

FIG. 1b illustrates a connected-life server in support of the connected-life service of FIG. 1a according to an embodiment of the present invention. The connected-life server 100 may be implemented by one or more computers/servers distributed in multiple geographical locations. The connected-life server manages the connected-data-set among the different computing devices a user may create or store data, including personal computers 102 and 104, mobile devices 106, servers 108, and web portals 110 and 112.

Figure 1C:
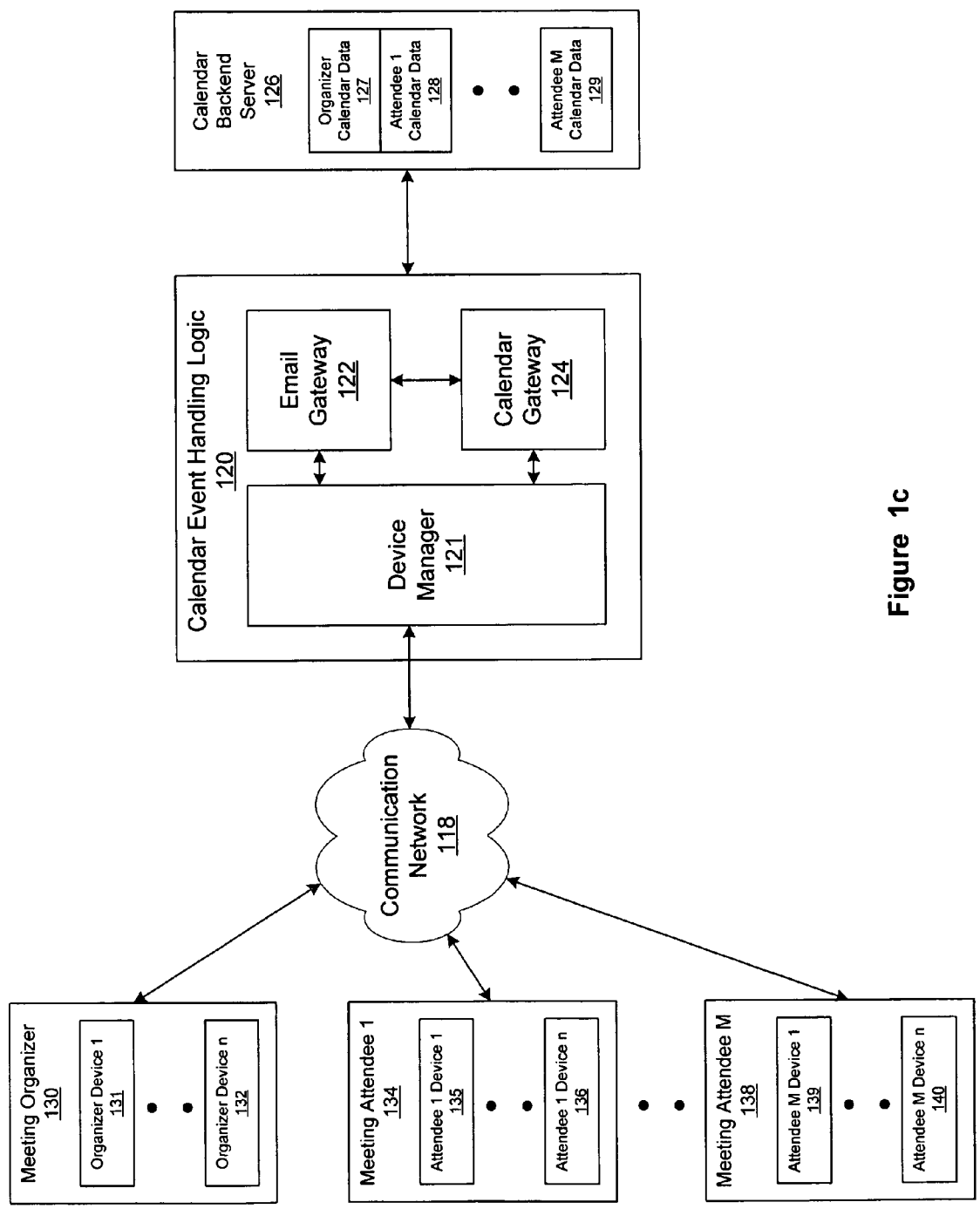
FIG. 1c illustrates portions of the connected-life server of FIG. 1b for managing calendar events according to an embodiment of the present invention.

FIG. 1c illustrates portions of the connected-life server of FIG. 1b for managing calendar events according to an embodiment of the present invention. In this scenario, both the meeting organizer and the meeting attendees are subscribers of the connected-life service. The connected-life server includes a calendar event handling logic 120 and a calendar backend server 126. The calendar event handling logic 120 includes a device manager 121, an email gateway 122, and a calendar gateway 124. The calendar event handling logic 120 communicates to multiple users, for example meeting organizer 130, meeting attendee 1 (134), and meeting attendee M (138) through a communication network 118. The device manager 121 interfaces with the multiple user devices through a record exchange (REx) application interface described below. For example, the device manager exchanges data records with the plurality of user devices, and synchronizes data records between the plurality of user devices and the calendar backend server. The device manager is further described in patent application Ser. No. 11/182,348, entitled "System and Method for Servicing a User Device," which is incorporated herein by reference in its entirety.

The email gateway 130 communicates the calendar events between the multiple user devices and the calendar gateway 132. For instance, the calendar gateway 1) translates data formats of the calendar events received from the meeting organizer device and the one or more attendee devices to a set of supported data formats by the calendar backend server; 2) generates calendar events to the meeting organizer device and the one or more attendee devices; and 3) synchronizes the corresponding connected calendar-data-set automatically among all devices of each connected user. The calendar gateway 132 processes the calendar events and stores the calendar events in the calendar backend server 134. For example, the email gateway receives calendar events from the meeting organizer device and the one or more attendee devices, and sends calendar events to the meeting organizer device and the one or more attendee devices according to data formats supported by the meeting organizer device and the one or more attendee devices. In addition, the email gateway forwards calendar events received from the meeting organizer device and the one or more attendee devices to the calendar gateway, and receives communications of the calendar events from the calendar gateway.

Each device may be a meeting organizer or a meeting attendee. In this specification, a meeting attendee refers to both as a meeting invitee who has received and has not yet accepted a meeting invitation and to a meeting invitee who has already accepted a meeting invitation. Also, each connected user may have one or more devices sharing a connected calendar-data-set. For instance, the meeting organizer 130 has organizer device 1 (131) and organizer device n (132). Similarly, the meeting attendee 1 (134) has attendee 1 device 1 (135) and attendee 1 device n (136); and the meeting attendee M (138) has attendee M device 1 (139) and attendee M device n (140). The calendar backend server 126 contains a set of corresponding connected calendar-data for each connected user, such as organizer calendar data 127, attendee 1 calendar data 128, and attendee M calendar data 129.

A calendar event may include a request received from a meeting organizer to create, update, cancel, or delete a meeting; or a notice sent to an attendee to create, update, cancel, or delete the meeting. A calendar event may further include a response received from an attendee to accept, decline, tentatively accept/decline, or propose a new meeting.

Figure 1D:
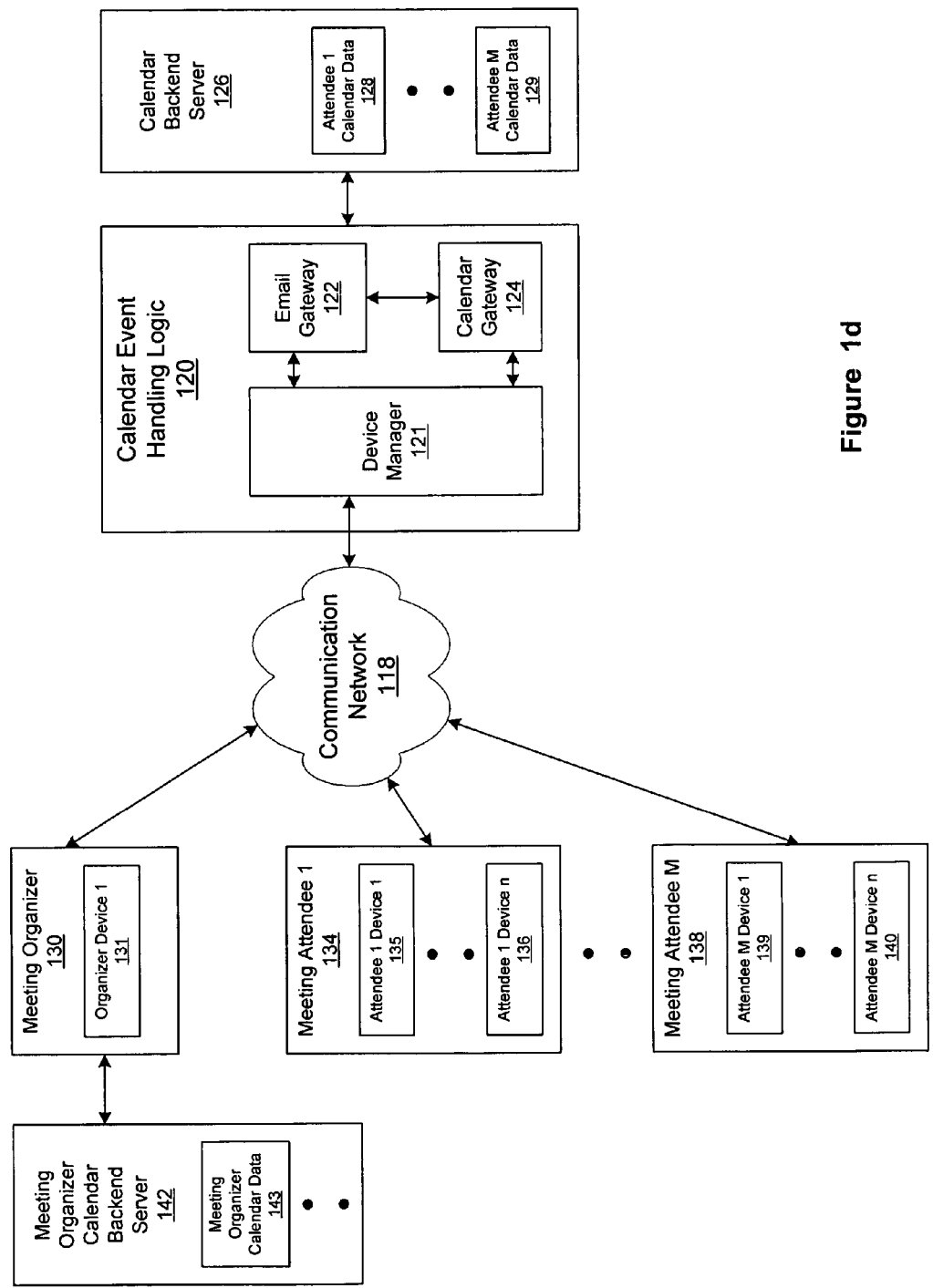
FIG. 1d illustrates a variation of FIG. 1c for managing calendar events according to an embodiment of the present invention.

FIG. 1d illustrates a variation of FIG. 1c for managing calendar events according to an embodiment of the present invention. This is the scenario that the meeting organizer is not a connected-life service subscriber while the meeting attendees are connected-life service subscribers. One of the differences between FIG. 1d and FIG. 1c is that the calendar backend server 126 (part of the CLS) no longer stores the meeting organizer calendar data. Instead, the meeting organizer 130 is supported by its corresponding meeting organizer calendar backend server 142, which contains storage for storing the meeting organizer calendar data 143. In addition, without the connected-life service, only one device from the meeting organizer 130, namely organizer device 1 (131) is involved in managing the calendar events. In this scenario, the unconnected meeting organizer communicates calendar events to the connected meeting attendees either through the email gateway 122 and calendar gateway 124 with an iCal compliant email application or directly with the calendar backend server 126 with a browser based application.

Figure 1E:
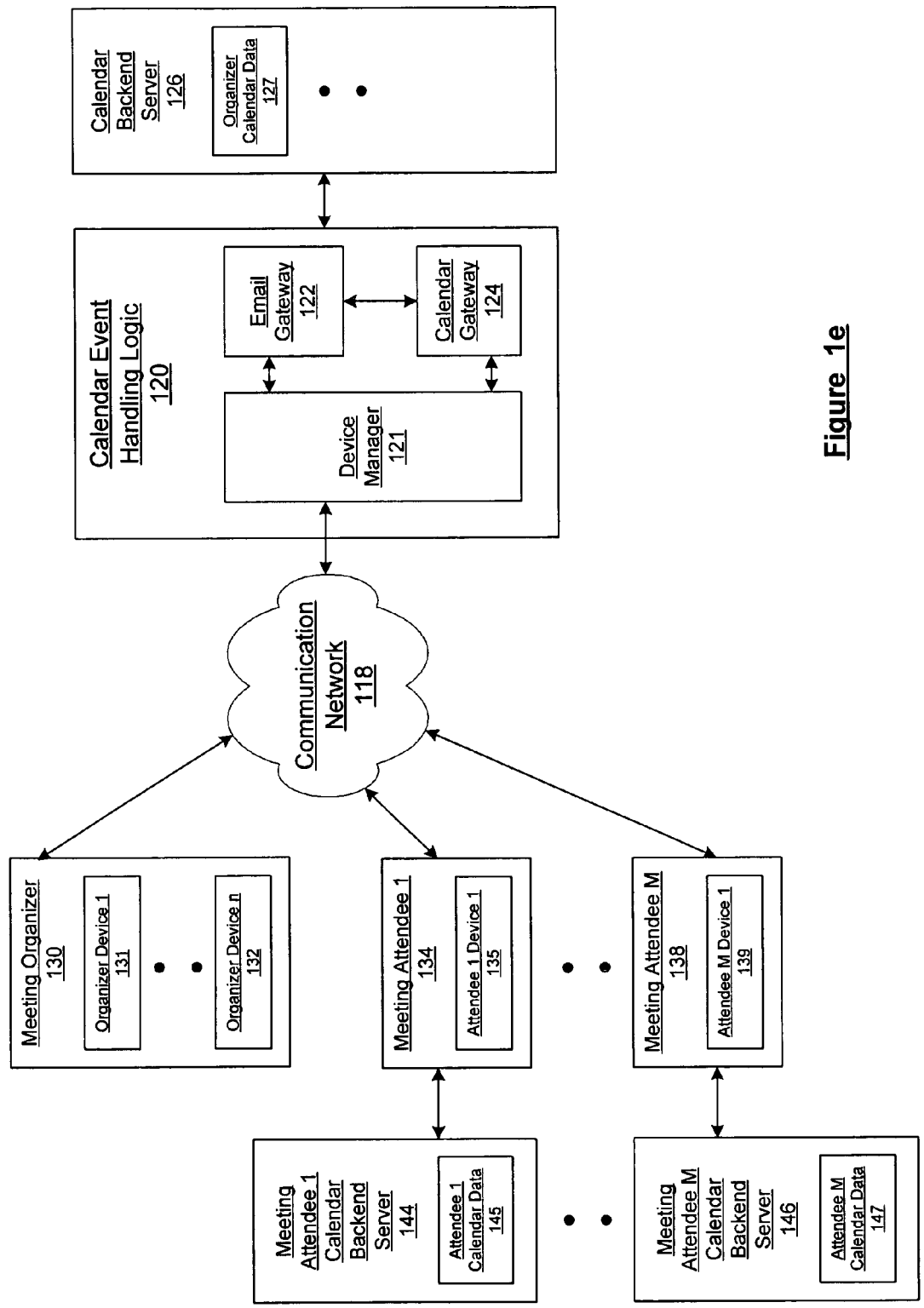
FIG. 1e illustrates another variation of FIG. 1c for managing calendar events according to an embodiment of the present invention.

FIG. 1e illustrates another variation of FIG. 1c for managing calendar events according to an embodiment of the present invention. This is the scenario that the meeting organizer is a connected-life service subscriber while the meeting attendees are not connected-life service subscribers. One of the differences between FIG. 1e and FIG. 1c is that the calendar backend server 126 (part of the CLS) no longer stores the meeting attendees' calendar data. Instead, the meeting attendee 1 (134) is supported by its corresponding meeting attendee 1 calendar backend server 142, which contains storage for storing the meeting attendee 1 calendar data 145; and the meeting attendee M (138) is supported by its corresponding meeting attendee M calendar backend server 146, which contains storage for storing the meeting attendee M calendar data 147. In addition, without the connected-life service, only one device from each meeting attendee, namely attendee 1 device 1 (135) and attendee M device 1 (139) is involved in managing the attendee's calendar events. In this scenario, an unconnected meeting attendee communicates calendar events to the connected meeting organizer either through the email gateway 122 and calendar gateway 124 with an iCal compliant email application or directly with the calendar backend server 126 with a browser based application. Both the email gateway 130 and the calendar gateway 132 are described in the following sections.

Figure 2:
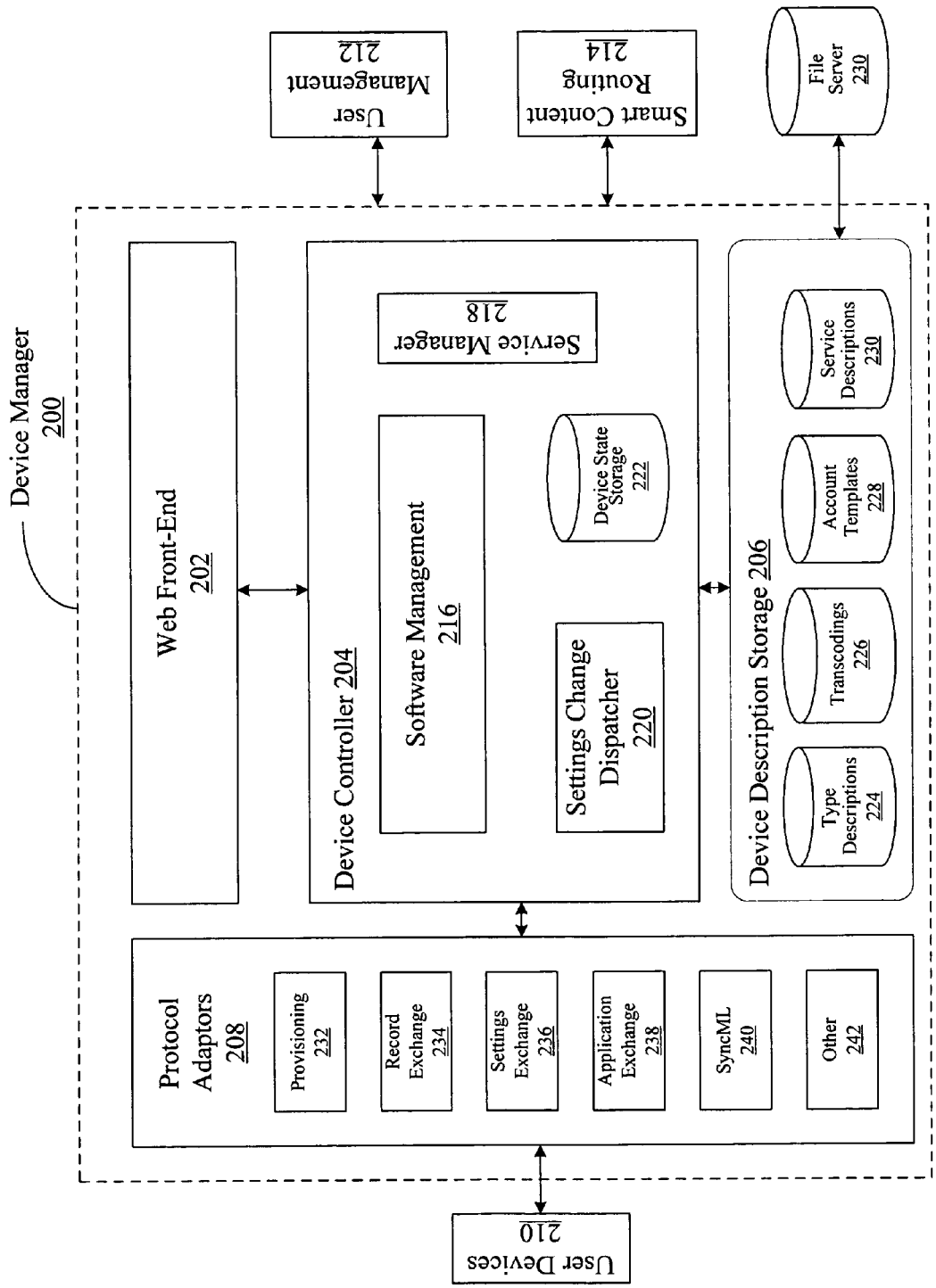
FIG. 2 illustrates an implementation of a device manager of a connected-life server according to an embodiment of the present invention.

FIG. 2 illustrates an implementation of a device manager of a connected-life server according to an embodiment of the present invention. The device manager 200 includes a web front-end 202, a device controller 204, a device description storage 206, and a set of protocol adapters 208. The device manager communicates and manages the user devices 210 through the protocol adapters 208. In addition, the device manager communicates with other portions of the connected-life server through a user management unit 212 and a smart content routing unit 214. Note that the user management unit is used to manage user devices from different services. This unit is optional if all users are from the same Internet service provider, such as the SBC-Yahoo DSL service.

The device controller 204 further includes a software management unit 216, a service manager 218, a settings change dispatcher 220, and a device state storage 222. The software management unit 216 installs, updates, and de-installs records, settings, and applications for the user devices. The service manager 218 manages the types of services supported for the user devices. The service manager provides information to the smart content routing unit 214 for transferring the connected-date-set among the user devices and the connected-life server. The setting change dispatcher 220 provides changes in device settings from the device manager to the user devices. The device state storage 222 stores the information about the operating states of the user devices.

The device description storage 206 stores type descriptions 224, transcodings 226, account templates 228, and service descriptions 230 of the user devices 210 supported by the connected-life service. The device manager transfers such device information between the device description storage 206 and a file server 230. The device manager associates user devices with different combinations of type descriptions, transcodings, account templates, and service descriptions such that each of the combination may be tested and verified for a predefined group of user devices. As a result, different service lines contain corresponding device characteristics and services may be provided to different groups of users.

The protocol adapters 208 may include a provisioning unit 232, a record exchange unit 234, a setting exchange unit 236, an application exchange unit 238, a SyncML unit 240, and other adaptor units 242. Note that the functional units described above (i.e. logical blocks 200-244) may be implemented in software, hardware, or a combination of software and hardware. The interactions among the functional units are further described in the following sections.

Record Exchange (REx) Application Program Interface

The Record Exchange API is designed to provide the functionality used in the SyncML (session-based) protocol. To accomplish this, the number of steps required and the commands used for accomplishing those steps are reduced. In the SyncML model, a process flow is described below:
  Authenticate
  Start session
  Initialize sync session (negotiate sync type per database type)
  Client sends records to the server (may require multiple messages)
  Server performs a synchronization between the client's data and its own
  Server acknowledges client's records and sends records to the client (may require multiple messages)
  Client acknowledges the server's records
  End session As mentioned above, the entire session completes successfully in order for the synchronization operation to be considered successful. This makes the overall process error-prone primarily due to network connectivity and device stability issues.

The Record Exchange API addresses the integrity problem of the SyncML (session-based) sync by breaking up the process into discrete operations that can be performed, for the most part, independently of one another. The concept of synchronization is divided into its two constituent parts: putting and getting items from the client's perspective and the concept of initialization can be combined with either of these actions. So instead of using actions in a process with cascading dependencies, a typical sync using the Record Exchange API is described as:
  The client initializes the data types it wants to use and sends items. The server sends an immediate response for this request. The server can indicate in its response whether there are items pending for the client. This step can be repeated as many times as the client deems necessary.
  The client initializes the data types it wants to use and requests items from the server. The server returns pending items to the client and indicates if there are still more pending. The client can repeat this step and include acknowledgement information.

Although there are only two steps shown above, the Record Exchange API provides different functions for carrying out different parts of those steps. Client devices can use a put/get process or a more detailed process that includes separate init and acknowledgement steps as desired. Each of these steps is discussed in more detail below.

Figure 3:
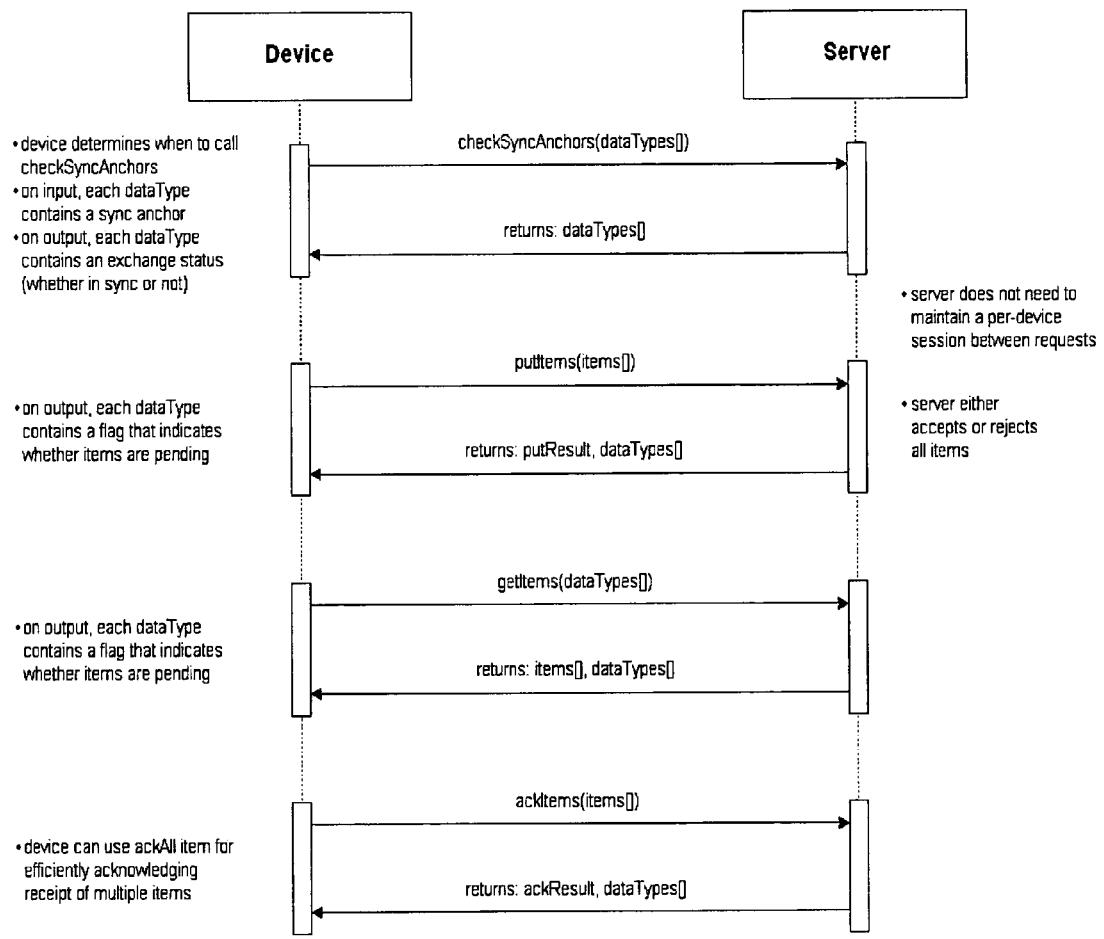
FIG. 3 illustrates an overview of the REx Protocol flow.

FIG. 3 illustrates an overview of the REx protocol flow. In order to support protocol changes and provide backward compatibility with older devices, the device sends the current protocol version as URL parameters together with each request.

Exchanging Records

Every item exchanged through the REx API is addressed. To accomplish this, the REx API defines several components that comprise a unique reference to an item. Not all of the components are used in every situation, but for any given item, the supplied addressing information needs to be sufficient to uniquely identify that item. The addressing components defined in the REx API are data source, data type, and record ID.

Of these components only the record ID is mandatory. For the other two it is possible that their value will be implied in the operation being performed, in which case they can be omitted. The data source component is used to allow clients to create new items in different data sources, if a client have the ability to determine the valid data sources and possibly also be able to allow the user to select which one to use.

Although the names of these components originate from the original domain of the REx API, they can be used for any addressing requirements. The record ID can be a setting path function, for example. Note that for certain data types the record ID is optional. In these cases the record ID may be omitted. Within each response from the server, there is one item for each record ID.

Clients send records to the server using the putItems call. This function takes as parameters an array of ExchangeItems. The server responds to each putItems call with an ExchangeResult structure that contains an array of data types that have pending changes and an acknowledgement for the received items. One requirement is that clients acknowledge all items received from the server before calling putItems.

At any time the client can query the server for pending items by sending a getItems request. This call examines the contents of the item cache and returns any records that are pending for the client. To facilitate an optimal exchange of items and status, a client can include acknowledgement information when getting new items by using the ackAndGetItems call. The format of the acknowledgement information is described below.

In response to each getItems call, the server returns an ExchangeResult that contains, among other things, an array of ExchangeItems containing the contents of the pending items and an array of DataTypes that indicate which data types have more items to be retrieved.

To optimize the flow of items from the server to the client, the server will always send delete items before add and replace items. The requirements of the getItems request include:

Clients send all pending changes, via putItems, to the server before calling getItems;

Clients include a limit value that the server will use to determine how much information to return in response to each getItems call; and Clients call ackItems immediately following a getItems call.

Items are acknowledged in both directions so that the client and server know when an item has been successfully processed. Note that the terms ack and acknowledge are used interchangeably throughout this document. There are two ways to acknowledge the receipt of an item through getItems: via an individual ack or via an ack all ExchangeItems. Failure acks always require an individual ack ExchangeItem so the exact item and cause of failure can be identified. Ack all ExchangeItems are handled such that all items that are received before the item being acknowledged are interpreted as successfully processed. The Ack-all-items method contains a valid data type name. This implies that a separate ack-all-items is required for each data type involved in an exchange.

The server does not return any ack items in response to a putItems call. Instead it returns an overall result response for the entire putItems call. In other words, the processing of the items in a putItems call is an all-or-nothing operation. For this reason the item ref value is not used when acknowledging items sent from the client. Clients omit this value from the ExchangeItems they send to the server. It is recommended that clients send ack-all-items as soon as possible so the server will have the most accurate state representation of the client.

Clients that cannot or chose not to store the proposed record IDs can send back map commands that contain the (temporary) Locate Unit ID (LUID) proposed by the server and the LUID that represents the record on the client. Clients send map commands to the server by passing ExchangeItems in an ackItems call. Map commands can be sent at any time and can be sent any number of times (in the case of communication failures), and are not interpreted as an implicit receipt acknowledgement of items. Note that clients still explicitly pass an ack item even for items are that are ID mapped. Clients use the server's record IDs until they have sent map commands to the server.

To map the IDs, the client echoes back ExchangeItems received from the server, after changing the item type and replacing the data member with the client's LUID. In one embodiment, an example of ExchangeItem sent from the server is shown below:

```
struct ExchangeItem
{
    itemRef = 100
    itemType = 1         // add
    dataTypeName = contacts
    recordID = LUID
    data = contact_data
}
```

The client may return a map command like this:

```
struct ExchangeItem
{
    itemRef = 100
    itemType = 5         // map
    dataTypeName = contacts
    recordID = old LUID
    data = new LUID
}
```

Record Exchange Data Structures

In one embodiment, examples of data structures of the REx are shown below.

```
struct DataType
{
    string      dataTypeName
    string      syncAnchor              optional
    string      pendingSyncAnchor       optional
    int         exchangeStatus          optional
}
struct ExchangeItem
{
    int         itemRef                 see note below
    int         itemType                see note below
    string      dataSource              optional
    string      dataTypeName            optional
    string      recordID                optional
    string      jobID                   optional - used by Get, Query & Query
                                        Result
    int         result                  optional - used to acknowledge changes
    Value       data                    optional - type is any valid XML-RPC
                                        type
}
```

ItemRef is a unique identifier that the server uses to reference an item it sends to the client. The client uses this value to acknowledge items it has received from the server. ItemRefs are a monotonically increasing sequence of integer values. The server maintains a sequence for each data type.

The device can also mark commands which it sends to the server with a monotonically increasing sequence of itemRef values. When a connection between the server and the device is interrupted, the server detects re-send commands by examine the itemRef values and ignores already received commands. The device maintains an itemRef sequence for each data type for which it supports commands with itemRef values. The device ensures that it sends according to data type for all or for non-commands an itemRef value.

In one approach, valid item types are listed below:

| | | |
|---|---|---|
| Add | 1 | |
| Replace | 2 | |
| Delete | 3 | |
| AddOrReplace | 4 | only valid from device to server |
| Map | 5 | not stored persistently |
| Get | 6 | |
| Ack | 7 | not stored persistently |
| Ack All | 8 | not stored persistently |
| Query | 9 | |
| Query Result | 10 | |
| Query End | 11 | |
| Clear | 12 | |
| GetResult | 15 | |

Data Contents:
- Record content of the data—for adds and replaces
- NULL—for deletes unless additional information is required to perform the delete operation (as in some preference management cases)
- Record LUID—for maps
- Optional filter—for Query commands

```
struct ExchangeResult
{
    int                                         result
    DataType[ ]         dataTypes               optional
    ExchangeItem[ ]     items                   optional
}
```

The REx API is a flexible protocol for exchanging records or data. However, despite the flexibility built into the REx API, there will be situations where the core type definitions do not provide all of the required information. One way to resolve this issue is to define custom types based on the core type definitions that the API provides. This is handled since REx is based on XML-RPC. All of the structures defined in the REx API are transferred as structures in the XML-RPC format. XML-RPC structures can be viewed as a collection of name/value pairs. To extend a structure, a new name/value pair is added.

The REx API parser builds generic XML-RPC objects and passes them to marshaller functions that reside in protocol handler classes. The core REx API functions reside in a single protocol handler, but it is possible to define custom protocol handlers that inherit the entire core REx API functions while providing specialized functions for their own purposes. These specialized functions can marshal the parameters they receive and handle extended types appropriately. An example of an extended type is shown below:

```
struct DMExchangeItem extends ExchangeItem
{
    string      dataTypeID   used to provide additional addressing
                             information in the form of mapping
                             information
}
```

The above structure may be passed anywhere an ExchangeItem is expected, but functions that understand the DMExchangeItem type can also search and use the dataTypeID information.

Record Exchange Statuses and Result Codes

Table 1 defines the valid exchange statuses and result codes. Note that not all values listed are applicable in all cases. Consult the individual function definitions for the exact values that apply to each function.

TABLE 1

|  |  | Device to server acks item result | Device to server initRefresh data type exchange status | Server to device data type exchange status | Overall result |
|---|---|---|---|---|---|
| 200 | OK (generic successful result) | x |  | x | x |
| 201 | OK (records pending); the server is not forced to send 201 even when it has changes |  |  | x |  |
| 250 | Exchange refresh (client will be restored from data source records) |  | x |  |  |
| 300 | The device is in the zombie mode |  |  |  | x |
| 400 | Bad request (generic request error) | x |  | x | x |
| 401 | Unknown external user ID (this overall error code is only valid for devices which do not use the security servlet to send the request to the server) |  |  |  | x |
| 404 | Unknown data type | x |  | x |  |
| 410 | The server does not support the client protocol version |  |  |  | x |
| 417 | Refresh required (e.g. sync anchor mismatch) |  |  | x |  |
| 420 | Device full (the device ran out of memory/"disk" space/ . . . ) | x |  |  |  |
| 421 | Temporary error, retry later | x |  |  |  |
| 422 | Command for a non-existing item received | x |  |  |  |
| 423 | Servers requires itemRef values for commands from device to server and device-sent commands without itemRef values |  |  | x |  |
| 500 | Generic temporary server error |  |  |  | x |

In one approach, the requests and their corresponding structures and responses that are used to inform the CLS about error situations are described below. The structures are also used to clear the errors when the error situations no longer exist.

The ErrorMessage structure is sent as a parameter to the raiseError and closeError requests. Not all members are set for all errors and all request methods. For each error and request method, the members are defined as unused, optional and mandatory. Note that the number in brackets after a member defines the maximum length of a member.

```
struct ErrorMessage
{
// Location of the problem
String databaseID[64];          // the id of a database for Rex or the
                                // SetEx database name for SetEx. Otherwise
                                // not set.
String dataItemID[128];         // the global ID of the Rex data item or
                                // the setting path for SetEx. Otherwise
                                // not set.
String taskID[64];              // the ID of the task in which the problem
                                // occured.
// User information
String whereDisplay[128];       // the display string in the client
                                // language to show the user where the
                                // problem occurred.
String whatDisplay[2048];       // the display string in the client
                                // language to show what went wrong.
String when;                    // When did the problem happen (UTC time)
// Component location - where is the component that
// detected the problem
String machineDisplayName[64];  // human readable name of the machine.
                                // If more than one deployment may run
                                // on this machine, be as specific as
                                // possible to identify this instance.
```

```
String componentName[64];      // the name of the software component that
                               // detected the problem. This is
                               // information for the developer. The
                               // component version may be included.
String exception[2048];        // the exception that causes the problem.
String context[2048];          // the reason why the error is detected or
                               // if possible the reason of the problem
                               // itself. Also any additional information
                               // to find the problem reason can be added
                               // here.
// Programmatic information to handle the bug in the error
// dispatching and view system
String messageID[64];          // a worldwide unique ID for every error
                               // message. This is the reference if you
                               // close a message or resend it and it
                               // may not show up twice.
String userAction[32];         // One of the NO_ACTION, VIEW_ACTION,
                               // TAKE_ACTION or IMMEDIATE_TAKE_ACTION.
int errorID;                   // One of the predefined errors ids. The
                               // error category is part of the upper
                               // bits.
}
```

As response to all requests, the Error Response structure is returned to the calling device.

```
struct ErrorResponse {
  int status;          // the status of the executed request.
  String message;      // A general message field which is e.g.
                       // used to transport error messages for
                       // developers.
}
```

As response to each request, the CLS returns the outcome of the request by setting the status member in the response structure. The values for the status member are:

TABLE 2

| Name | Value | Description |
| --- | --- | --- |
| OK | 200 | CLS executed the request without a problem. |
| BAD_REQUEST | 400 | CLS was not able to understand the request at all. This may not happen and is a hint to a client bug. |
| INVALID_ARGUMENT | 402 | A mandatory member of the ErrorMessage structure is missing or one member of the ErrorMessage structure was set with an invalid value e.g. the string is too long. The message field will hold the name of the invalid field. |
| TEMPORARY_SERVER_ERROR | 500 | CLS has a temporary problem. The device may retry the request with an increasing delay. |

The raiseError call is used to inform the CLS that an error has occurred on the device. The Error Response request takes an ErrorMessage structure as argument where different members are set according to the error type. As a result, an Error Response structure is returned.

ErrorResponse raiseError(ErrorMessage)

The closeError request clears the error that is reported by a previous raiseError request. Only the messageID member of the ErrorMessage structure is used for the closeError request. When the CLS receives the request, it clears a previous reported error with the same messageID.

ErrorResponse closeError(ErrorMessage)

Record Exchange Functions

This section describes the functions in the Record Exchange API. For the functions that modify parameters passed to them, the following convention is used:

→ a right-pointing arrow indicates that value is set by the client and not modified by the server ← a left-pointing arrow indicates that server does not read the value sent by the client but will return a value ↔ a bi-directional arrow indicates that server both reads the client's value and returns a possibly updated value The pre-exchange functions of the record exchange API include checkSyncAnchors, initRefresh, and queryChanges. Descriptions of the pre-exchange functions, their corresponding formats and parameters are provided below.

checkSyncAnchors: A client calls this function with both anchors for the data type inside the DataType structure to verify that one of the two sync anchors matches the server anchor. If a sync anchor check fails for a given data type, then the server will return a refresh-required result. The sync anchor values stored on the server will not be modified.

ExchangeResult checkSyncAnchors(DataType[ ] dataTypes)

Parameters:

dataTypes—an array indicating which data types to use in the check:

→ dataTypeName

→ syncAnchor—the current device sync anchor for this data type.

→ pendingSyncAnchor—the pending anchor for this data type.
Returns: an ExchangeResult which contains a DataType array with the appropriate exchangeStatus specified for each DataType.
← result—200 (OK) when the server has successfully processed the request, or a defined error code.
← dataTypes holds the exchangeStatus for the data types—200 (OK), 201, or a defined error code.

initRefresh: If the client determines, or has been told by the server, that a refresh is required, then it calls initRefresh to begin the refresh process.
ExchangeResult initRefresh(DataType[] dataTypes)
Parameters:
dataTypes—an array indicating which dataTypes to use in the initialization:
→ dataTypeName,
→ exchangeStatus—250 (Exchange refresh),
→ syncAnchor—the new anchor for this data type.
Returns: an ExchangeResult populated as follows:
← result—200 (OK) when the server has successfully processed the request, or a defined error code.
← dataTypes indicates the init status for each data type specified in the original call: 200 (OK), 201, or a defined error code.

queryChanges: This function is used for cases where a client wants to poll the server for any pending changes, perhaps to provide user feedback, prior to performing an exchange.
ExchangeResult queryChanges(DataType[] dataTypes)
Parameters:
dataTypes—an array defining which dataTypes to use for the change query. Sending an empty data type array will query changes for all data types.
→ dataTypeName
Returns: an ExchangeResult populated as follows:
← result—either 200 (OK) when the server has successfully processed the request, or a defined error code.
← dataTypes indicates which DataTypes have pending changes on the server. If the caller passes an empty dataTypes parameter, then the data type's array result will contain only the data types for which changes exist on the server. If the caller passes a non-empty dataTypes parameter, then the same array will be returned with 200 (no changes), 201 (records pending), or 417 exchange status specified for each data type.

The post-exchange functions of the record exchange API include ackItems, putItems, and ackAndPutItems. Descriptions of the post-exchange functions, their corresponding formats and parameters are provided below.
ackItems: After receiving items from the server, a client returns an acknowledgement to the server. This informs the server of the arrival status of each record, thereby allowing the server to efficiently manage its cache of the client's data. In one implementation, this function uses an array of ExchangeItems, which is what the server returns to the client in the various getItems calls. The client only needs to specify the itemRef and result members of each ExchangeItem. Another way to use this function is to send an ExchangeItem with itemType set to Ack All, dataType set according to the group of items being acknowledged, and itemRef set to the last item successfully processed for that dataType. The server interprets this as a successful acknowledgement for all items of that dataType whose itemRef is less than or equal to the specified itemRef value. Note that it is possible to send multiple ExchangeItems this way. All individual ack items are included before ack-all-items in the itemAcks parameter.

ExchangeResult ackItems(ExchangeItem[ ] itemAcks)
Parameters:
itemAcks—an array of ExchangeItems containing information about the items being acknowledged. The requirements for the itemAcks are as follows:

TABLE 3

| ExchangeItem member | Requirements for Ack | Requirements for Ack All |
| --- | --- | --- |
| itemRef | Yes | Yes |
| itemType | Yes | Yes |
| result | Yes | Optional (200) |
| dataTypeName | Yes | Yes |
| all others | Maybe | Maybe |

Returns: an ExchangeResult populated as follows:
← result—either 200 (OK) when the server has successfully processed the request, or a defined error code.
← DataTypes—a dataType structure array; each element is holding the exchangeStatus: 200) or a defined error code.

putItems: This function allows the client to send a number of items to the server.
ExchangeResult putItems(DataType[ ] dataTypes, ExchangeItem[ ] items):
Parameters:
DataType—the device sends for all dataTypes which are used in the items array from this request a new sync anchor.
→ dataTypeName
→ syncAnchor—the new anchor for this data type.
items—an array of ExchangeItems containing the records to be sent to the server.
Returns: an ExchangeResult populated as follows:
← result—200 (OK) when the server has successfully processed the request, or a defined error code.
← dataTypes—a DataType structure array for the data types in the request; each element is holding the exchangeStatus: 200, 201, or a defined error code.

ackAndPutItems: This function is similar to the putItems with the addition of a parameter that allows the client to acknowledge received items before putting new ones.
ExchangeResult ackAndPutItems(ExchangeItem[] acks, DataType[] dataTypes, ExchangeItem[] items)
Parameters—similar to putItems, with the addition of the following:
acks—contains acknowledgement information for specific ExchangeItems. The server will process these acks before accepting records from the client. See the ackItems function description for more information.
Returns: same as putItems.

getItems: The client calls this function to retrieve pending records for one or more data types. This is a common method of retrieving records from the server. The itemRef value for each data type allows the server to determine which records in the item cache the client has already received and which ones still need to be sent. The client may send in this field the last processed itemRef.
ExchangeResult getItems(DataType[] dataTypes, int limit)
Parameters:
dataTypes—an array of DataType structures that inform the server which data types to sync and at which point in the item cache to begin sending records. The DataType items are passed as follows:
→ dataTypeName—the name of the data type.
→ syncAnchor—the new anchor for this data type.

The server will ignore requests for getItems when the DataType array contains no element.

limit—this is an optional parameter that specifies the maximum size of the uncompressed response XML-RPC message. If this value is omitted, then the server will use a limit value that it deems to be reasonable.

Returns: an ExchangeResult that is populated as follows:
← result—200 (OK) when the server has successfully processed the request, or a defined error code.
← dataTypes—contains DataType structures for each of the data types from the request that have items ready to be retrieved. It is populated as follows:
← dataTypeName
← exchangeStatus—either 200 (OK), 201, or a defined error code.
← items—contains the pending records, populated as follows:
← itemRef
← itemType
← recordID—is a temporary LUID for add items, a client LUID for all other item types.
← dataTypeName
← data—is omitted for delete items.

ackAndGetItems: This function is similar to getItems with the addition of a parameter that allows the client to acknowledge received items while getting new ones.

ExchangeResult ackAndGetItems(ExchangeItem[ ] acks, DataType[ ] dataTypes, int limit)

Parameters:

acks—contains acknowledgement information for specific ExchangeItems. The server will process these acks before retrieving records from the item cache. See the ackItems function description for more information.

Figure 4:
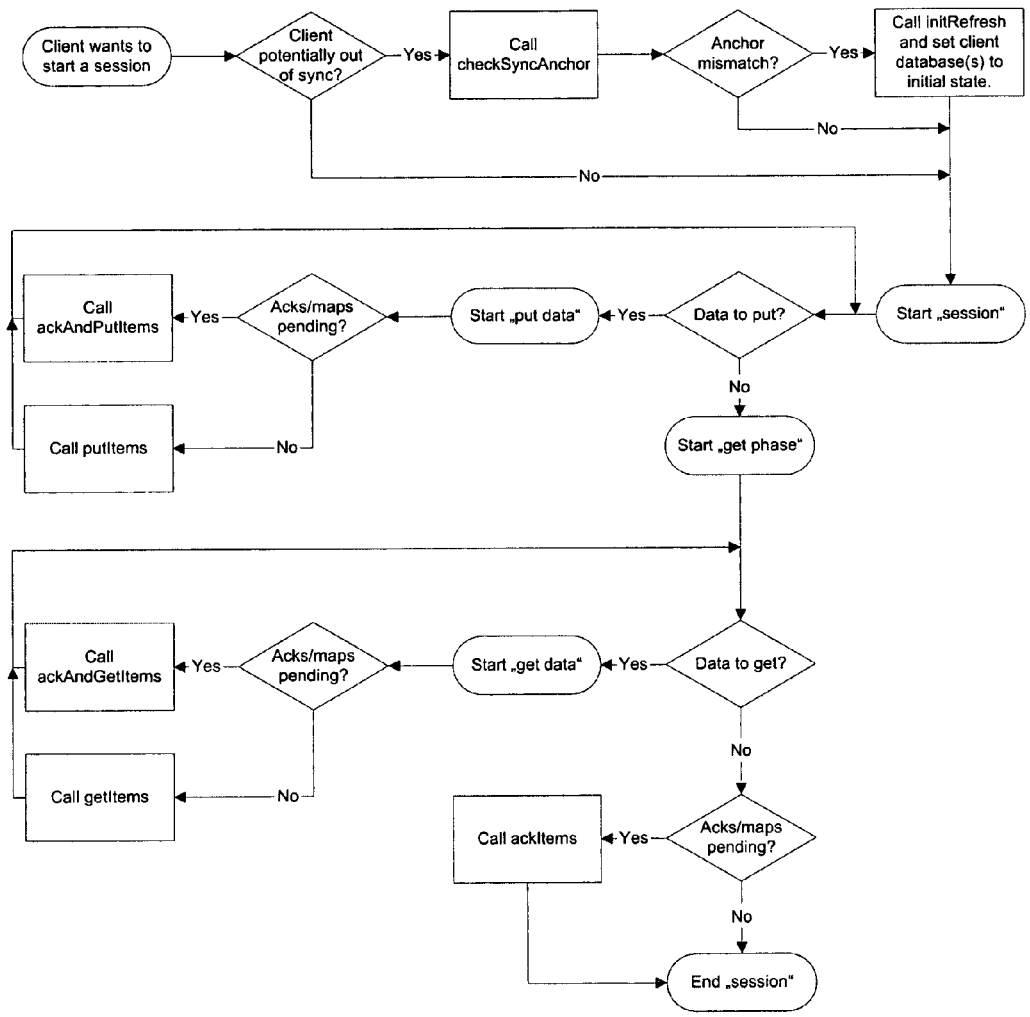
FIG. 4 illustrates a flow diagram of interactions between a user device and a server using the different REx methods.

FIG. 4 illustrates a flow diagram of interactions between a user device and a server using the different REx methods.

Record Exchange Item Types

As a response to the getItems or ackAndGetItems request, the server may return a Clear command. This command has no data content and forces the device to remove all items for the given data type name.

In some situations, such as importing client device PIM data as part of the initial sync or fetching shadow data from a dataSource, the server can return a Query command to the device to force the device to upload the data for the given data type to the server.

Figure 5:
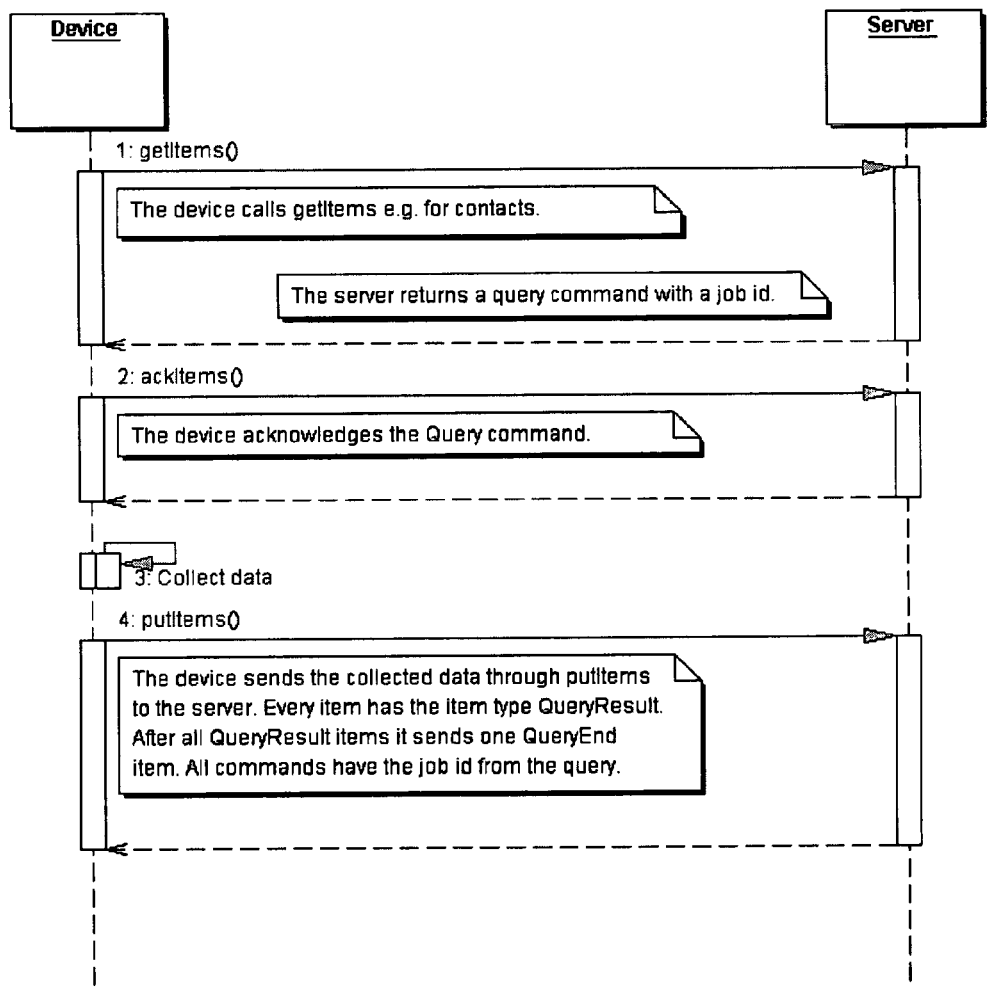
FIG. 5 illustrates a sequence diagram for a query process according to an embodiment of the present invention.

FIG. 5 illustrates a sequence diagram for a query process according to an embodiment of the present invention. In step 1, the device calls the getItems method to request information from the server. In response to a getItems or ackAndGetItems request, the server returns a Query command. In the ExchangeItem of the command, the jobID field is set and marks this query. An optional data field may contain a filter to restrict the query. When no filter is given, the device will return all items for the given data type. An example of ExchangeItem for a Query command is shown below:

```
struct ExchangeItem {
    itemRef = 222
    itemType = 9              // Query
    dataTypeName = contacts
    jobID        = e2f28cee570111d89d7fac1000270000
}
```

In step 2, the device calls ackItems to acknowledge that it has received the Query command. In step 3, the device collects the queried data. In step 4, the device sends the data to the server using putItems. Each queried item is sent as one QueryResult. After all QueryResult items are sent, one QueryEnd item is sent which marks that the data upload for the query is done. All QueryResult and QueryEnd items have the jobID field set to the job ID from the query to indicate that these items are related to the query with this jobID. An example of QueryResult and the final QueryEnd ExchangeItem is shown below:

```
struct ExchangeItem {
    itemType = 10                              // QueryResult
    dataTypeName = contacts
    jobID        = e2f28cee570111d89d7fac1000270000
    data = <contact class="PUBLIC">...</contact>
    recorded = BB0gAA==                         // LUID
}
struct ExchangeItem {
    itemType = 11    // QueryEnd
    dataTypeName = contacts
    jobID        = e2f28cee570111d89d7fac1000270000
}
```

When the result for the query is too large for one putItems call, the device may use multiple putItems to upload the items to the server. The final QueryEnd command is sent only in the last putItems call.

When the device restarts after step 2, for example after a device crash, after a user turned off the device, or after replacement of a dead battery, it continues with the query. Since the device has already acknowledged the Query command, the server will not resend this command. Therefore the device makes this command persistent to survive the restart. To avoid this situation, the device may acknowledge the Query command by calling ackAndPutItems in step 4.

Note that the server may set a filter as part of the Query command using the data field. In one implementation, the server only uses the string {partial} as filter for dataSources. This filter informs the dataSource to return only shadow information for the queried items. This will reduce the amount of uploaded data. When the server needs the complete item, it will send a Get command to fetch it.

When the server requests for the shadow information (through the partial filter), the dataSource returns this information for the different type of data, such as mail, contact, task, and event items.

A Get command requests the device, by specifying a LUID, to upload the specified item to the server using putItems. Below is an example of ExchangeItem for a Get command:

```
struct ExchangeItem {
    itemRef = 392
    itemType = 6              // Get
    dataTypeName = AAAAANWXbwt76SlDtJeWirnVnshCgQAA
    recordID = RDIgAA==        // LUID
    jobID        = 3a2f1bee57c111d8ae44ac1000270000
}
```

The device sends the item back using a GetResult. A job ID is used to connect the Get and the GetResult:

```
struct ExchangeItem {
    itemType = 15                                    // Get Result
    dataTypeName = AAAAANWXbwt76SlDtJeWirnVnshCgQAA
    recordID = RDIgAA==                              // LUID
    jobID        = 3a2f1bee57c111d8ae44ac1000270000
    data = ...
}
```

Note that like the query case the device uses ackAndPutItems to acknowledge the Get command and to send the requested item in one call to the server, or the device makes the result of the Get command persistent. When the device receives a Get for a non-existing item, it acknowledges the item with the 422 status code.

A QueryResult command is used by the device in the result of a query and as a response to a Get command. When a dataSource detects a new item, it sends an Add command to the server. When the dataSource detects a huge amount of new items (e.g. a new email folder with thousands of emails copied into the dataSource), it sends a QueryResult command for each new item containing only the shadow information. Upon sending the last piece of information of the QueryResult command, a QueryEnd command is sent to inform the server that the upload has finished. The server will send Get commands when it needs the complete information of one item. This reduces the amount of data send for such cases.

Meeting Request Handling

The meeting request handling feature is the ability for a meeting organizer and for a meeting attendee to manage their respective meetings on different devices. The meeting organizer designates the user to organize a meeting through any of his devices on which he may perform such an operation. According to embodiments of the present invention, it is assumed that all connected calendar backend servers are aggregated on the CLS calendar backend, which means that if multiple calendar backend servers are connected, all events are aggregated on the CLS calendar backend and are marked with a dataSource identifier pointing to the calendar on which the event was created.

There are three different classes of devices:

Basic Email Devices: This class of devices handles calendar events through email application only. Examples of the basic email devices include the Nokia 6820, Nokia 6230, and Sony Ericsson T616.

Basic Email/Calendar Devices: This class of devices has a mail application and a simple calendar application that cannot store the entire event content and in particular does not store attendee lists, GUID, etc. The Symbian device is an example of this class of devices, which include the Nokia 6600, Nokia 6620, and Nokia 6682.

Smart Devices: This class of devices has a mail application and a powerful calendar application that can store the entire event content and have multiple calendar folders. Examples of this class of devices include the Smartphone (Audiovox SMT 5600), Pocket PC (imate PDA 2k or T-Mobile MDA III), and Outlook Connector.

The following features are supported for each class of the devices described above. For a basic email device with only a mail application connected, it allows users to respond to meeting invitations and meeting updates with one of the three values: accept, tentatively accept, or decline. This is accomplished by including a link to the web browser of the calendar gateway in an email message. A recipient of the calendar event may click on the link and view a few simple user interface fields of the calendar event, such as the meeting title, start, and end time. Other simple user interface fields may be provided for the user to accept, tentatively accept, or decline the meeting invitation.

For a basic email/calendar device, a user is able to respond to meeting invitation requests and meeting updates. It is also able to schedule meetings by creating a simple event and sending it to a list of recipients. For a smart device with full-fledged email and calendar applications like the Outlook Connector, a user on such a device is able to respond to meeting requests and updates as well as scheduling meetings and updating them. Note that the Pocket PC device also belongs to this category.

Interfaces and Infrastructures

Given that the CLS calendar gateway and the CLS email gateway for a given email account may run on the same physical instance of the gateway, a new interface meetingProcessor is introduced for synchronously communicating between a CLS email gateway and its corresponding CLS calendar gateway. Note that in the case where the multiple user devices are connected to multiple calendar backend, one default calendar backend is selected to aggregate the user's calendar events.

In one approach, a Java interface of the meetingProcessor is shown below.

```
public interface meetingProcessor {
    /**
     * This method is for an organizer sending out a meeting request or update
    to a list of
     * attendees.
     *
     * @param extUserID    The extUserID of the default calendar gateway.
     * @param vsCal        Value Object representing the event. The
    CLSInvitationURL
     *                     is filled for each attendee when the call returns.
     * @throws com.verdisoft.gwutil.DatasourceException   Error code will
    specify type of error using the
     *                     standard Datasource Gateway convention for temp errors
    and
     *                     permanent errors.
     */
```

-continued

```
    public void processOrganizerRequest(String extUserID, VSCalendarVO vsCal)
throws DatasourceException;
    /**
    *
    * @param extUserID    The extUserID of the default calendar gateway.
    * @param vsCal        Value Object representing the attendee's response.
    *                     Key fields are GUID, Sequence, DTSTAMP and Attendee
    *                     status in attendee list.
    * @throws com.verdisoft.gwutil.DatasourceException   Error code will
specify type of error
    *                     using the standard Datasource Gateway convention
    *                     for temp errors and permanent errors.
    */
    public void processOrganizerResponse(String extUserID, VSCalendarVO vsCal)
throws DatasourceException;
    /**
    *
    * @param extUserID    The extUserID of the default calendar gateway.
    * @param vsCal        Value Object representing the event. GUID, Sequence,
    *                     DTSTAMP are checked if event with same GUID
    *                     already exists in the backend.
    * @throws com.verdisoft.gwutil.DatasourceException   Error code will
specify type of error
    *                     using the standard Datasource Gateway convention for
    *                     temp errors and permanent errors.
    */
    public void processAttendeeRequest(String extUserID, VSCalendarVO vsCal)
throws DatasourceException;
    /**
    *
    * @param extUserID    The extUserID of the default calendar gateway.
    * @param vsCal        Value Object representing the event. Key fields
    *                     are GUID, Sequence, DTSTAMP and Attendee status
    *                     in attendee list.
    * @throws com.verdisoft.gwutil.DatasourceException   Error code will
specify type of error
    *                     using the standard Datasource Gateway convention
    *                     for temp errors and permanent errors.
    */
    public void processAttendeeResponse(String extUserID, VSCalendarVO vsCal)
throws DatasourceException;
}
    /**
    * This method is called when an invitation email is detected through the
CLS header
    * for CLS invites. The event may be created on the Default Calendar (CLS)
of the
    * extUserID and the event may be returned as VSCalendarVO value object (or
XML string)
    *           *
    * @param extUserID    The extUserID of the default calendar gateway.
    * @param vsCal        Value Object representing the event. Will be filled in
    *                     in the response.
    * @param iid          The CLS invite id found in the invitation email header
    * @throws com.verdisoft.gwutil.DatasourceException   Error code will
specify type of error
    *                     using the standard Datasource Gateway convention
    *                     for temp errors and permanent errors.
    *
    */
    public void getEventFromYIID(String extUserID, VSCalendarVO vsCal, String
iid) throws DatasourceException;
```

In one approach, new attributes in XML event content are described below. DTStamp: This key tag is added in the XML event content. It is defined as follows:

The property indicates the date/time that the instance of the iCalendar object was created.
This property is included in the "VEVENT", "VTODO", "VJOURNAL" or "VFREEBUSY" calendar components.
The value is specified in the UTC time format.
This property is also useful to protocols such as [IMIP] that have inherent latency issues with the delivery of content. This property will -continued assist in the proper sequencing of messages containing iCalendar objects.

This property is different than the "CREATED" and "LAST-MODIFIED" properties. These two properties are used to specify when the particular calendar data in the calendar store was created and last modified. This is different than when the iCalendar object representation of the calendar service information was created or last modified.

XML Specification:

```
<event>
    ...
    <dtstamp>
        utc-daytime (yyyymmddThhmmssZ)
    </dtstamp>
    ...
</event>
```

Sequence: This key tag is added in the XML event content. It is defined as follows:

When a calendar component is created, its sequence number is zero (US-ASCII decimal 48). It is monotonically in- cremented by the "Organizer's" CUA each time the "Organizer" makes a significant revision to the calendar component. When the "Organizer" makes changes to one of the following properties, the sequence number is incremented:
"DTSTART"
"DTEND"
"DUE"
"RDATE"
"RRULE"
"EXDATE"
"EXRULE"
"STATUS"
In addition, changes made by the "Organizer" to other properties can also force the sequence number to be incremented. The "Organizer" CUA increments the sequence number whenever it makes changes to properties in the calendar component that the "Organizer" deems will jeopardize the validity of the participation status of the "Attendees." For example, changing the location of a meeting from one locale to another distant locale could effectively impact the participation status of the "Attendees."
The "Organizer" includes this property in an iCalendar object that it sends to an "Attendee" to specify the current version of the calendar component.
The "Attendee" includes this property in an iCalendar object that it sends to the "Organizer" to specify the version of the calendar component that the "Attendee" is referring to.

XML Specification:

```
<event>
    ...
    <sequence>
        integer(0)
    </sequence>
    ...
</event>
```

Recurrence-ID: This key tag is added in the XML Event content. It is defined as follows:

This property is used in conjunction with the "UID" and "SEQUENCE" property to identify a specific instance of a recurring "VEVENT", "VTODO" or "VJOURNAL" calendar component. The property value is the effective value of the "DTSTART" property of the recurrence instance.
The default value type for this property is DATE-TIME.
The time format can be any of the valid forms defined for a DATE-TIME value type. See DATE-TIME value type definition for specific interpretations of the various forms. The value type can be set to DATE. If the value of the "DTSTART" property is a DATE type value, then the value is the calendar date for the recurrence instance.
The date/time value is set to the time when the original recurrence instance may occur; meaning that if the intent is to change a Friday meeting to Thursday, the date/time is still set to the original Friday meeting.
The "RECURRENCE-ID" property is used in conjunction with the "UID" and "SEQUENCE" property to identify a particular instance of a recurring event, to-do or journal. For a given pair of "UID" and "SEQUENCE" property values, the "RECURRENCE-ID" value for a recurrence instance is fixed. When the definition of the recurrence set for a calendar component changes, and hence the "SEQUENCE" property value changes, the "RECURRENCE-ID" for a given recurrence instance may also change. The "RANGE" parameter is used to specify the effective range of recurrence instances from the instance specified by the "RECURRENCE-ID" property value. The default value for the range parameter is the single recurrence instance only. The value can also be "THISANDPRIOR" to indicate a range defined by the given recurrence instance and all prior instances or the value can be "THISANDFUTURE" to indicate a range defined by the given recurrence instance and all subsequent instances.

sendMail: This is a Boolean flag in XML mail content. When an attendee responds to a meeting invitation, the device generates an email with the event content attached to it regardless whether the user has decided to send a response back to the organizer or not. This mechanism is used to make sure the mail gateway receives the event content, and communicates it to the CLS calendar gateway, so the calendar gateway can create the event or update the status of the attendee (for example if the device doesn't have a local calendar application). The sendMail flag in the XML Mail content is used to specify to the mail gateway whether the email is sent after the relevant event content is processed by the CLS calendar gateway.

XML Specification:

```
<note>
    ...
    <sendMail>
        Boolean (true)
    </sendMail>
    ...
</note>
```

The status fields include Attendee-in-list, Meeting-at-Organizer, and Meeting-at-Attendee. The Attendee-in-list field status is used as sub tag in meeting event in list of attendees for each single attendee. The Meeting-at-Organizer field status is used as main tag of the entire meeting event in the Organizer's calendar. The Meeting-at-Attendee field status is used as main tag of the entire meeting event in the Attendee's calendar.

| STATUS | Attendee-in-list | Meeting-at-Organizer | Meeting-at-Attendee |
|---|---|---|---|
| Needs Action | Org(*) | | Org(*) |
| Accepted | Org | | Att |
| Declined | Org | | |
| Delegated | Org | | |
| Tentative | Org | | Att |

-continued

| STATUS | Attendee-in-list | Meeting-at-Organizer | Meeting-at-Attendee |
|---|---|---|---|
| Cancelled | Org | Org | |
| X-Organized | Org | | |

Org - this value is set at this place by Organizer only.
Att - this value is set at this place by Attendee only.
(*)Default value - the absence of the entire status tag is equal to a status tag with this value. Due to duplicate detection please don't send the default value.

Meeting Organizer

In general, meetings are created on the device and synchronized through REx to the CLS calendar backend. Invitations are sent out through any connected email account available, but the email gateway makes sure that the event is created and kept up-to-date on the CLS calendar backend before sending out the invitation. Responses to meeting requests received on a connected email account are automatically forwarded to the CLS calendar backend for the attendee status update.

Figure 6:
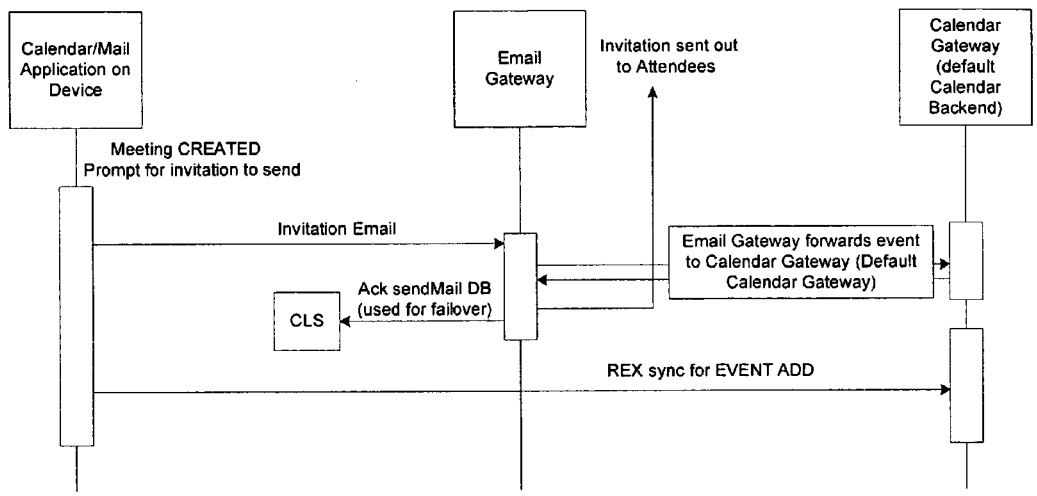
FIG. 6 illustrates a workflow for outbox handling when an organizer creates a meeting according to an embodiment of the present invention.

FIG. 6 illustrates a workflow for outbox handling when an organizer creates a meeting according to an embodiment of the present invention. If the client device is a smart device, a meeting is created. The event has all the necessary attributes set, in particular, the event has: 1) a valid GUID; 2) a Sequence attribute set to 0; 3) a valid DTStamp with the date of creation of the invitation; and 4) a valid attendee list with valid email addresses. The user is prompted whether or not an invitation email may be sent. The email is sent out through the connected-email-account chosen on the device only if the organizer has decided to send the invitation. The event is synchronized (added) through REx as any other event.

If the client device is a basic email/calendar device, an event is created on a device. This event may not have all the necessary attributes set. In particular, the GUID may not be a real GUID, the sequence attribute may be missing, and the attendee list may be missing as well. At this point, the event is just a simple event. It will become a 'meeting' when attendees are added to it. On such basic devices, this will be done by sending the event by email to a list of recipients as a simple attachment.

When the event is sent out by email, the device follows the two points below. First, a valid GUID is generated as well as a sequence attribute with initial value 0 and a DTStamp attribute with the current date on it. The recipient list is added as attendee to the event. All those fields are stored on a local inventory on the device and subsequently synchronized through REx. Second, the full event content is attached to the outgoing email in the XML format if the organizer had decided to send out invitations. The event changes (such as changes in attendee list, GUID, sequence attribute, DTStamp attribute) are synchronized through REx to the calendar backend.

The Email Gateway makes sure the event has been created on the calendar backend before sending out the invitation. The processOrganizerRequest method on the meetingProcessor interface is called and invitation URLs are set in the response. The invitation emails are sent (one for each attendee since the invitation URL for the CLS invite is different for each attendee). The sendMail database is acknowledged (this is used as a failover in case of the gateway restarting or crashing).

The calendar gateway receives the new events either through the processOrganizerRequest interface or through a REx add. If the REx add happens first, then the processOrganizerRequest will only retrieve the CLS invitation URL.

If the processOrganizerRequest call happens first, then the calendar gateway creates this event on the backend assigning the dataSource identifier found in the event's content (chosen by the user at creation time) but may not allow this event to synchronize back to CLS (the event will be in a 'hidden' state). In particular it may not assign any recordID for this event. When the REx add reaches the calendar gateway, the gateway recognizes through a GUID lookup that the event already exists on the backend, and activates the hidden event.

Figure 7:
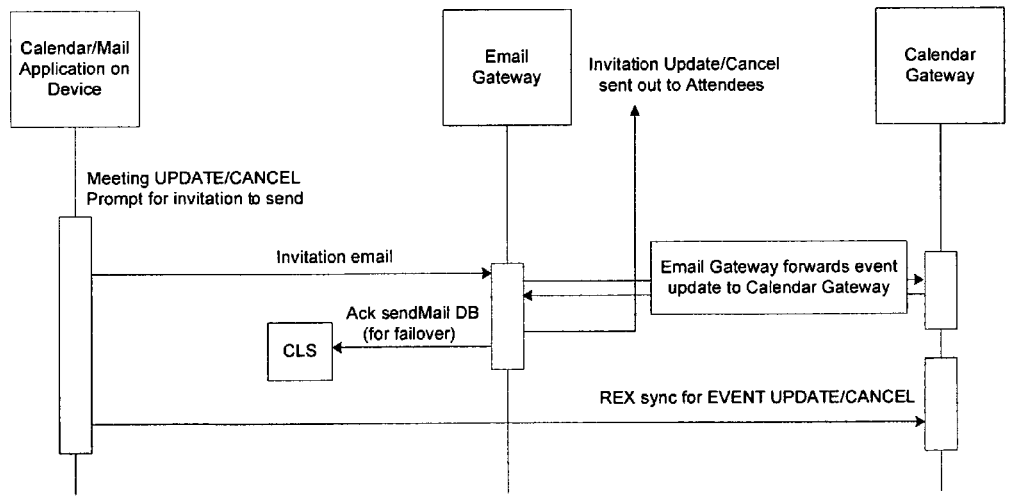
FIG. 7 illustrates a workflow for outbox handling when an organizer updates a meeting according to an embodiment of the present invention.

FIG. 7 illustrates a workflow for outbox handling when an organizer updates a meeting according to an embodiment of the present invention. If the client is a smart device, a meeting is updated. The user is prompted to decide if an invitation email is sent. The sequence attribute for the event is increased by 1, the DTStamp is set to the current time, and the attendee statuses are reset to 'Needs-Action'. The event is synchronized through REx update. The email invitation is sent; it contains the full event content as an alternate item in the XML format.

When the user updates an event on a basic email/calendar device, the device recognizes the event as a meeting with attendees and prompts the user whether to send out an invitation for the update/cancellation. If the event has some fields not viewable on the UI of the device, the device reverts the update and informs the user in order to avoid overwriting such fields (for example: recurrence rules), or warns the user and overwrites them (typically such fields are handled by the data modulation on the server). The sequence attribute is increased by one. The DTStamp is set and the status of the attendees is reset. The event is synchronized through REx update. The email invitation is sent; it contains the full event content as an alternate item in the XML format.

The Email gateway receives the invitation mail in the sendMail queue. The Email Gateway makes sure the event is up-to-date on the calendar backend before sending out the invitation. The processOrganizerRequest method on the meetingProcessor interface is invoked. The Email Gateway gets the CLS invite URLs back in response to the processOrganizerRequest call. The invitation is sent out to each attendee with the relevant CLS invite URL for each attendee. The sendMail database is acknowledged. Note that this is used as a failover in case of the gateway restarting or crashing.

The calendar gateway may receive the updated event either through the processOrganizerRequest interface or through a REx update. If the REx add happens first, then the processOrganizerRequest will only retrieve the CLS invitation URL and reset the attendee statuses.

If the processOrganizerRequest happens first, then the calendar gateway has also to update the event in order to get the new invitation URLs to send and resets the attendee statuses. When the REx update reaches the calendar gateway, the gateway will recognize through a GUID lookup that the event already exists on the backend, update that event with relevant updated values if any (for example alarm timer). Under normal operation, there will not be any update. The Gateway may not reset the attendee statuses when processing the REx update. The CLS also implements some logic to make sure duplicates are not created when updates are conflicting from the device and from the calendar gateway. This is done by checking the Sequence and DTStamp attributes.

Figure 8:
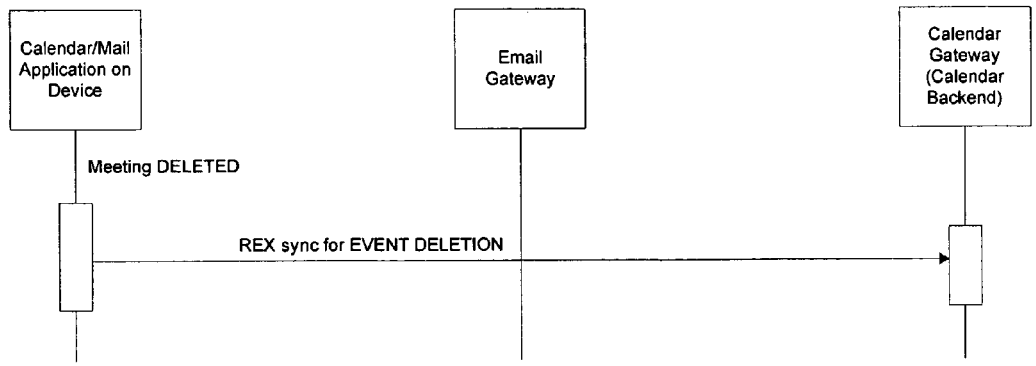
FIG. 8 illustrates a workflow for outbox handling when an organizer deletes a meeting according to an embodiment of the present invention.

FIG. 8 illustrates a workflow for outbox handling when an organizer deletes a meeting according to an embodiment of the present invention.

Figure 9:
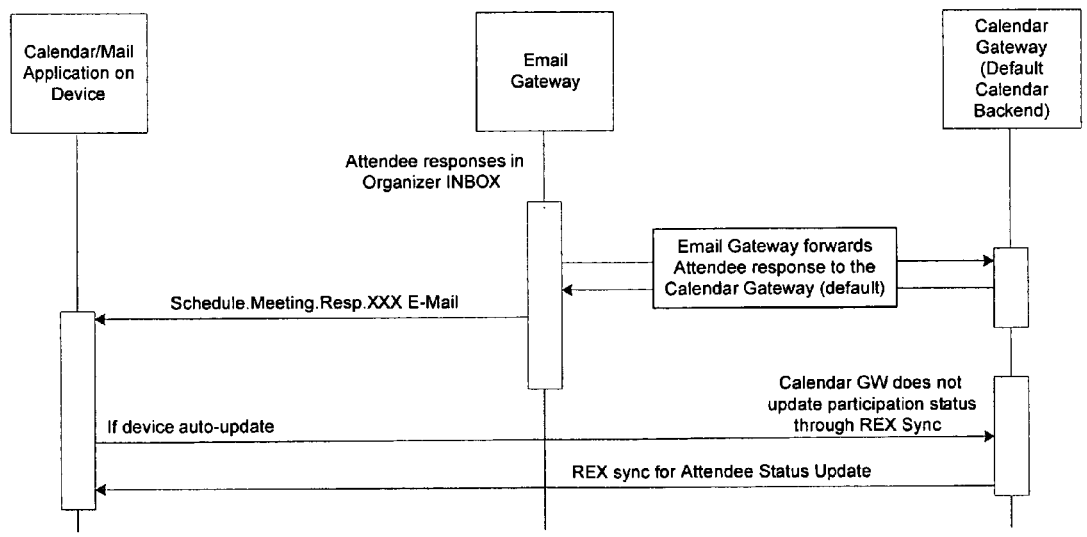
FIG. 9 illustrates a workflow for inbox handling when an organizer receives a response from an attendee according to an embodiment of the present invention.

FIG. 9 illustrates a workflow for inbox handling when an organizer receives a response from an attendee according to an embodiment of the present invention. For basic email devices or basic email/calendar devices, the attendee status is probably not visible on the device. The email informs the user of the attendee response in these cases. The calendar backend updates the status. The client device receives an email with one of the attendee's participation status. If the device has auto-update features enabled, the local event on the device may have the attendee participation status updated, but such a field update may be rejected by the CLS calendar gateway through REx. The client device receives the status update through REx update from the calendar gateway.

The Email Gateway issues a processOrganizerResponse call on the meetingProcessor interface with the participation status update. The Email Gateway synchronizes the email with Schedule.Meeting.Resp.XXX in the note content.

The Calendar Gateway processes the processOrganizerResponse call. It first locates the meeting events in its inventory based on the GUID. It then checks for the attendee value it receives to compare the timestamp with the timestamp it has last stored for that attendee, and updates the event in the backend and in the inventory only if the timestamp is more recent. If an attendee status is updated on the calendar gateway, a REx sync will update all devices. The calendar gateway may not update attendee statuses through REx sync. It ignores the 'attendee status' part of such updates. This is to avoid overwriting a status with an older value.

Meeting Attendee

In general, when an attendee receives an invitation (meeting request) on a connected-email-account, the Email Gateway forwards the event to the CLS calendar backend. If event doesn't exist on the backend, the event is created on the CLS backend without any dataSource identifier assigned. If the event is already on the backend, the email gateway updates the event after comparing Sequence and DTStamp attributes.

When an attendee reads an invitation on a connected device, if the device has the capability to auto-create or auto-update the event, the device makes sure that if an event with a matching graphical user identifier (GUID) existed already that the auto-create does not generate a duplicate; if the device does not find any event with a matching GUID, it may prevent the auto-creation from happening, or deletes the auto-created event.

If the device does not have the capability to auto-create or auto-update events, it checks whether the event is already on the device's calendar (GUID lookup). If a matching GUID is found, the device may update the local event. If no matching GUID is found, the device does not create the event. The event is synchronized from the backend if it matches the filter. This does not prevent the user from responding to the invitation. Under normal operation, the event has already synchronized on the device by the time the user reads the invitation email.

In one approach, the user is prompted to decide on which backend the event is created. The device checks whether an event has been assigned a dataSource identifier. If not, the user is prompted to decide on which calendar the event to be created and assigned the dataSource identifier, so the CLS calendar gateway may be updated accordingly.

The attendee may send back a response back to the organizer via any of his connected email accounts. The email gateway, through which the response goes out, forwards the attendee's status update to the CLS calendar gateway, and sends the response to the organizer.

Figure 10:
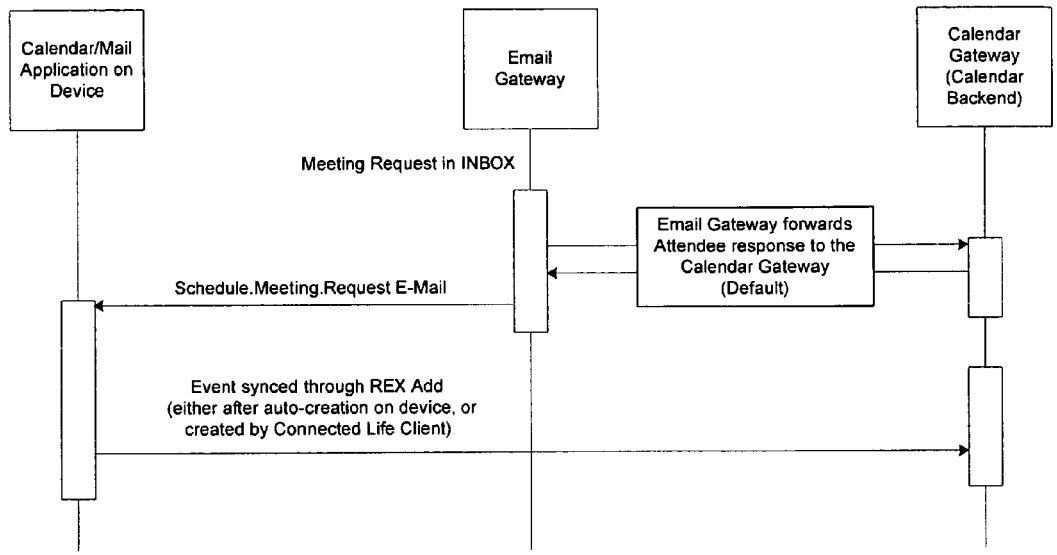
FIG. 10 illustrates a workflow for inbox handling when an attendee receives a new meeting according to an embodiment of the present invention.

FIG. 10 illustrates a workflow for inbox handling when an attendee receives a new meeting according to an embodiment of the present invention. The client receives an email with type Schedule.Meeting.Request. The device makes sure no events are auto-created. If an event is auto-created, it is deleted. If there is already an event with a matching GUID, the device updates the event.

The gateway recognizes the invitation either by the content-type of the iCal attachment or via a header of the CLS invites. For CLS invites, the email gateway calls the getEventFromYIID method, which returns the event as VSCalendarVO value object (or XML string) and creates the event on the attendee's CLS calendar backend. For iCal attachments, the processAttendeeRequest method of the meetingProcessor interface is invoked to create the event in the attendee's calendar. The email gateway synchronizes the email with the type 'Schedule.Meeting.Request'.

The calendar gateway (and the default calendar backend) receives the new event through the processAttendeeRequest or the getEventFromYIID method on the meetingProcessor interface depending on the invitation type, for example regular iCal as opposed to CLS invite. It adds the new event to the default calendar backend for the user.

Figure 11:
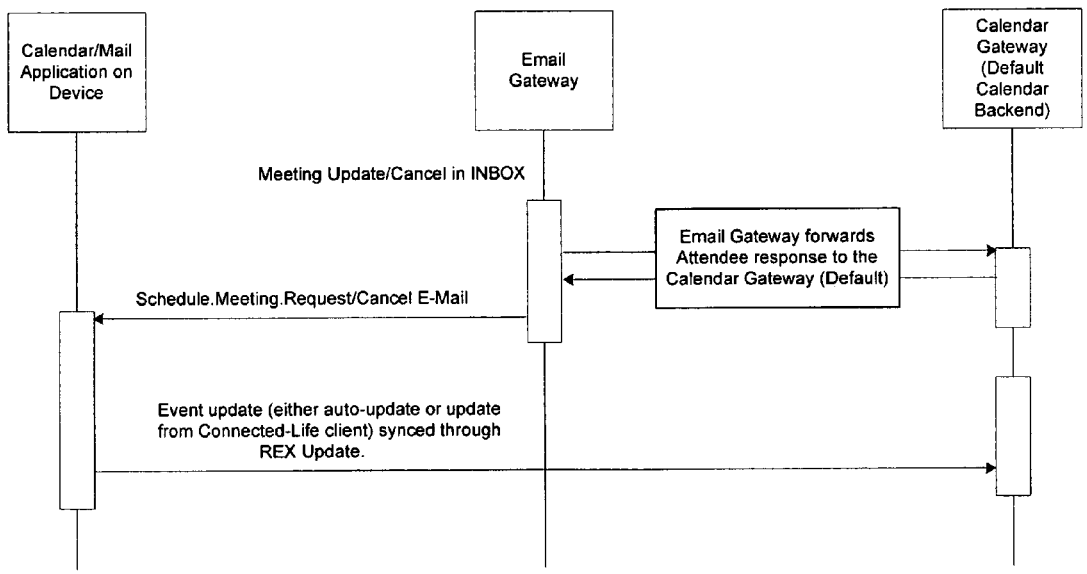
FIG. 11 illustrates a workflow for inbox handling when an attendee receives an update for a meeting according to an embodiment of the present invention.

FIG. 11 illustrates a workflow for inbox handling when an attendee receives an update for a meeting according to an embodiment of the present invention. The client receives an email with type Schedule.Meeting.Request/Cancel. If the event is auto-updated, the CLS client makes sure that no duplicates are created. If the device does not have the auto-update feature, it updates the event and makes sure not to create any duplicates. Note that it is also possible that there is no event on the device, for example, the event does not match the filter window so is not created on the device.

The email gateway recognizes the invitation either by the content-type of the iCal attachment or via a header for CLS invites. For CLS invites, the email gateway calls the getEventFromYIID method, which returns the event as VSCalendarVO value object (or XML string) and updates/cancels the event on the attendees CLS calendar backend. For an iCal attachment, the processAttendeeRequest method of the meetingProcessor interface is invoked to create the event in the attendee's calendar. The email gateway synchronizes the email with the type 'Schedule.Meeting.Request' or 'Schedule.Meeting.Cancel'.

The calendar gateway receives the event through the processAttendeeRequest or the getEventFromYIID method on the meetingProcessor interface depending on the invitation type such as iCal attachments or CLS invites. It updates the event on the default calendar backend of the user or removes it in case of a cancel request.

Figure 12:
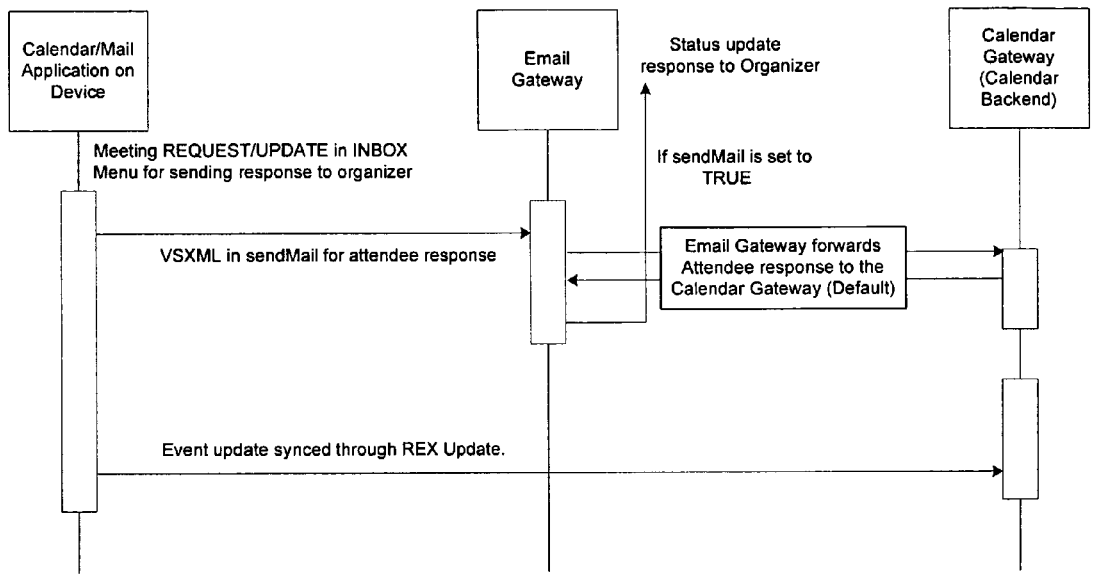
FIG. 12 illustrates a workflow for outbox handling when an attendee sends a participation status back to the organizer according to an embodiment of the present invention.

FIG. 12 illustrates a workflow for outbox handling when an attendee sends a participation status back to the organizer according to an embodiment of the present invention. For all three classes of devices, the user selects its participation status on the local mail application or calendar application on the device (Accepted, Declined, or Tentative). The user is prompted to decide if the response is to be sent out or not. The user is prompted to select the calendar backend to create this event on (if multiple backends). This situation happens if the event has synchronized to the device and it does not have its dataSource identifier assigned. A response email is sent out through the email gateway with the corresponding Schedule.MeetingResp.XXXtype. The full event is attached in the email. This happens even if the user has decided to not send the response to the organizer. In that event the original invitation is deleted from the inbox.

At the email gateway, it receives the response email to send. Then, the email gateway invokes the processAttendeeResponse method on the meetingProcessor interface for the update of the attendee's status. The email is sent out if the user sets the sendMail flag to true.

The calendar gateway processes the processAttendeeResponse interface. It locates the event in its inventory based on the GUID, and makes sure the event response corresponds to the correct meeting using the Sequence or DTStamp attributes. If the event matches the event in the calendar backend, it updates the status. There may not be any conflict when there is a REx update for changes on the device. The CLS makes sure to resolve conflicting update through the Sequence and DTStamp attributes.

Figure 13:
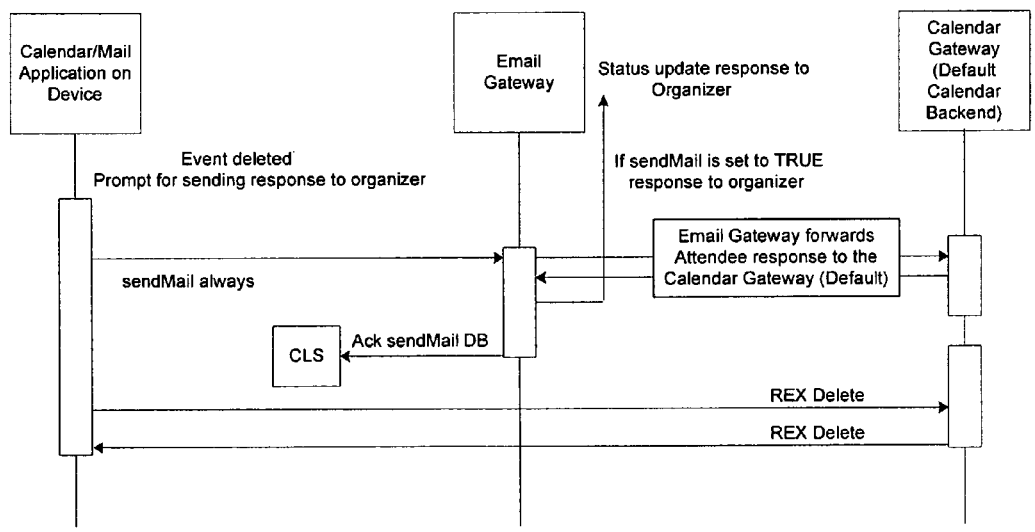
FIG. 13 illustrates a workflow for outbox handling when an attendee deletes a meeting according to an embodiment of the present invention.

FIG. 13 illustrates a workflow for outbox handling when an attendee deletes a meeting according to an embodiment of the present invention. For all three classes of client devices, the user removes the meeting event from a calendar application. The user is prompted to decide if the response is to be sent out to the organizer. A response email is sent out through the email gateway with the Schedule.Meeting.Resp.Neg type. The full event is attached in the email in order for the email gateway to generate the correct response to the organizer.

The email gateway receives the response email to send. The email is sent out if the user sets the sendMail flag to true. The Calendar Gateway receives a REx delete for the event.

When an attendee updates a meeting, the update is synchronized through REx. However, receiving an update for the same meeting by email from the organizer overwrites this update. Note that this case enables the device to differentiate a meeting for which it is an attendee from a meeting for which the attendee is the organizer. This is done through the top level status field of the event. The organizer receives a value X-Organized, and the attendee receives a value matching his participation status, such as Needs-Action, Accepted, Declined, or Tentative.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as are suited to the particular use contemplated.

What is claimed is:

1. A system comprising:
one or more server devices comprising a device manager for interfacing with a plurality of user communication devices, wherein at least a subset of the plurality of user communication devices use different calendar applications and calendar events in different data formats and a remainder of the plurality of user communication devices have no calendar applications, and wherein the plurality of user communication devices include at least a meeting organizer device and one or more attendee devices;
a calendar gateway for processing the calendar events to form a corresponding connected calendar-data-set for each connected user, wherein the connected calendar-data-set is stored in a calendar backend server and is shared among one or more devices of each connected user, wherein the calendar gateway comprises:
logic for translating data formats of the calendar events received from the meeting organizer device and the one or more attendee devices to a set of supported data formats by the calendar backend server; and
logic for generating calendar events to the meeting organizer device and the one or more attendee devices such that a meeting is generated from an email of an event sent by the meeting organizer device wherein recipients of the email are added as attendees of the meeting if the meeting organizer device is one of the remainder having no calendar application; and
an email gateway for communicating the calendar events between the calendar gateway and the plurality of user communication devices, for each user communication device of the subset of user communication devices that has calendar applications with one of the different data formats, information about a calendar event is communicated to the user communication device in accordance with a respective one of the different data formats, and the email gateway further communicating information to the remainder of the plurality of user communication devices via a web page of the calendar gateway such that the remainder of user communication devices are enabled to respond to the calendar events via the web page and not a calendar application.

2. The system of claim 1, wherein the plurality of user communication devices comprise:
cellular phones, wireless personal digital assistants, navigation devices, personal computers, game consoles, Internet terminals, and Kiosks.

3. The system of claim 1, wherein the calendar events comprise:
request received from the meeting organizer to create a meeting;
request received from the meeting organizer to update the meeting;
request received from the meeting organizer to cancel the meeting; and
request received from the meeting organizer to delete the meeting.

4. The system of claim 1, wherein the calendar events further comprise:
notice sent to an attendee to create a meeting;
notice sent to the attendee to update the meeting;
notice sent to the attendee to cancel the meeting; and
notice sent to the attendee to delete the meeting.

5. The system of claim 1, wherein the calendar events further comprise:
- response received from an attendee to accept a meeting;
- response received from the attendee to decline the meeting;
- response received from the attendee to tentatively accept/decline the meeting; and
- response received from the attendee to propose a new meeting.

6. The system of claim 1, wherein the device manager comprises:
- logic for exchanging data records with the plurality of user communication devices; and
- logic for synchronizing data records between the plurality of user communication devices and the calendar backend server.

7. The system of claim 1, wherein the calendar gateway further comprises:
- logic for synchronizing the corresponding connected calendar-data-set automatically among all communication devices of each connected user.

8. The system of claim 1, wherein the email gateway comprises:
- logic for receiving calendar events from the meeting organizer device and the one or more attendee devices; and
- logic for sending calendar events to the meeting organizer device and the one or more attendee devices in accordance with data formats supported by the meeting organizer device and the one or more attendee devices.

9. The system of claim 1, wherein the email gateway further comprises:
- logic for forwarding calendar events received from the meeting organizer device and the one or more attendee devices to the calendar gateway; and
- logic for receiving communications of the calendar events from the calendar gateway.

10. A method comprising:
- interfacing with a plurality of user communication devices, wherein at least a subset of the plurality of user communication devices use different calendar applications and calendar events in different data formats and a remainder of the plurality of user communication devices have no calendar applications, and wherein the plurality of user communication devices include at least a meeting organizer device and one or more attendee devices;
- processing the calendar events to form a corresponding connected calendar-data-set for each connected user, wherein the connected calendar-data-set is stored in a calendar backend server and is shared among one or more communication devices of each connected user, wherein processing the calendar event comprises:
  - translating data formats of the calendar events received from the meeting organizer device and the one or more attendee devices to a set of supported data formats by the calendar backend server;
  - generating calendar events to the meeting organizer device and the one or more attendee devices
  - generating a meeting from an email of an event sent by the meeting organizer device that is one of the remainder having no calendar application;
  - adding recipients of the email as attendees of the meeting; and
- communicating the calendar events between a calendar gateway and the plurality of user communication devices, for each user communication device of the subset of user communication devices that has calendar applications with one of the different data formats, information about a calendar event is communicated to the user communication device in accordance with a respective one of the different data formats, and for the remainder of the plurality of user communication devices, further communicating information via a web page of the calendar gateway such that the remainder of user communication devices are enabled to handle the calendar events via the web page and not a calendar application.

11. The method of claim 10, wherein the plurality of user communication devices comprise:
- cellular phones, wireless personal digital assistants, navigation devices, personal computers, game consoles, Internet terminals, and Kiosks.

12. The method of claim 10, wherein the calendar events comprise:
- request received from the meeting organizer to create a meeting;
- request received from the meeting organizer to update the meeting;
- request received from the meeting organizer to cancel the meeting; and
- request received from the meeting organizer to delete the meeting.

13. The method of claim 10, wherein the calendar events further comprise:
- notice sent to an attendee to create a meeting;
- notice sent to the attendee to update the meeting;
- notice sent to the attendee to cancel the meeting; and
- notice sent to the attendee to delete the meeting.

14. The method of claim 10, wherein the calendar events further comprise:
- response received from an attendee to accept a meeting;
- response received from the attendee to decline the meeting;
- response received from the attendee to tentatively accept/decline the meeting; and
- response received from the attendee to propose a new meeting.

15. The method of claim 10, wherein interfacing with the plurality of user communication devices comprises:
- exchanging data records with the plurality of user communication devices; and
- synchronizing data records between the plurality of user communication devices and the calendar backend server.

16. The method of claim 10, wherein processing the calendar events further comprises:
- synchronizing the corresponding connected calendar-data-set automatically among all devices of each connected user.

17. The method of claim 10, wherein communicating the calendar events comprises:
- receiving calendar events from the meeting organizer device and the one or more attendee devices; and
- sending calendar events to the meeting organizer device and the one or more attendee devices in accordance with data formats supported by the meeting organizer device and the one or more attendee devices.

18. The method of claim 10, wherein communicating the calendar events further comprises:
- forwarding calendar events received from the meeting organizer device and the one or more attendee devices to the calendar gateway; and
- receiving communications of the calendar events from the calendar gateway.

19. A non-transitory computer readable storage memory comprising program code, the computer program code comprising:

code for interfacing between a device manager and a plurality of user communication devices, wherein at least a subset of the plurality of user communication devices use different calendar applications and calendar events in different data formats and a remainder of the plurality of user communication devices have no calendar applications, and wherein the plurality of user communication devices include at least a meeting organizer device and one or more attendee devices;

code for processing the calendar events to form a corresponding connected calendar-data-set for each connected user at a calendar gateway, wherein the connected calendar-data-set is stored in a calendar backend server and is shared among one or more communication devices of each connected user, and wherein code for processing the calendar events comprises:

code for translating data formats of the calendar events received from the meeting organizer device and the one or more attendee devices to a set of supported data formats by the calendar backend server; and code for generating calendar events to the meeting organizer device and the one or more attendee devices such that a meeting is generated from an email of an event sent by the meeting organizer device wherein recipients of the email are added as attendees of the meeting if the meeting organizer device is one of the remainder having no calendar application; and code for communicating the calendar events at an email gateway to the calendar gateway and the plurality of user communication devices, for each user communication device of the subset of user communication devices that has calendar applications with one of the different data formats, information about a calendar event is communicated to the user communication device in accordance with a respective one of the different data formats, and for a remainder of the user communication devices of the plurality, the email gateway communicating information via a web page of the calendar gateway such that the remainder of user communication devices are enabled for responding to the calendar events via the web page and not a calendar application.

20. The non-transitory computer readable storage memory of claim 19, wherein the plurality of user communication devices comprise:

cellular phones, wireless personal digital assistants, navigation devices, personal computers, game consoles, Internet terminals, and Kiosks.

21. The non-transitory computer readable storage memory of claim 19, wherein the calendar events comprise:

request received from the meeting organizer to create a meeting;

request received from the meeting organizer to update the meeting;

request received from the meeting organizer to cancel the meeting; and request received from the meeting organizer to delete the meeting.

22. The non-transitory computer readable storage memory of claim 19, wherein the calendar events further comprise:

notice sent to an attendee to create a meeting;

notice sent to the attendee to update the meeting;

notice sent to the attendee to cancel the meeting; and notice sent to the attendee to delete the meeting.

23. The non-transitory computer readable storage memory of claim 19, wherein the calendar events further comprise:

response received from an attendee to accept a meeting;

response received from the attendee to decline the meeting;

response received from the attendee to tentatively accept/decline the meeting; and response received from the attendee to propose a new meeting.

24. The non-transitory computer readable storage memory of claim 19, wherein code for interfacing comprises:

code for exchanging data records with the plurality of user communication devices; and code for synchronizing data records between the plurality of user communication devices and the calendar backend server.

25. The non-transitory computer readable storage memory of claim 19, wherein code for processing the calendar events further comprises:

code for synchronizing the corresponding connected calendar-data-set automatically among all devices of each connected user.

26. The non-transitory computer readable storage memory of claim 19, wherein code for communicating the calendar events comprises:

code for receiving calendar events from the meeting organizer device and the one or more attendee devices; and code for sending calendar events to the meeting organizer device and the one or more attendee devices in accordance with data formats supported by the meeting organizer device and the one or more attendee devices.

27. The non-transitory computer readable storage memory of claim 19, wherein code for communicating the calendar events further comprises:

code for forwarding calendar events received from the meeting organizer device and the one or more attendee devices to the calendar gateway; and code for receiving communications of the calendar events from the calendar gateway.

* * * * *